(12) United States Patent
Holden et al.

(10) Patent No.: US 7,797,423 B2
(45) Date of Patent: Sep. 14, 2010

(54) COMPUTERIZED ACCESS DEVICE WITH NETWORK SECURITY

(75) Inventors: James M Holden, Valley Center, CA (US); Stephen E Levin, Poway, CA (US); James O Nickel, Dayton, MD (US); Edwin H Wrench, San Diego, CA (US)

(73) Assignee: Round Rock Research, LLC, Mount Kisco, NY (US)

( * ) Notice: Subject to any disclaimer, the term of this patent is extended or adjusted under 35 U.S.C. 154(b) by 54 days.

(21) Appl. No.: 11/776,445

(22) Filed: Jul. 11, 2007

(65) Prior Publication Data
US 2008/0010454 A1     Jan. 10, 2008

Related U.S. Application Data

(63) Continuation of application No. 10/877,791, filed on Jun. 25, 2004, now Pat. No. 7,475,137, which is a continuation of application No. 09/924,214, filed on Aug. 7, 2001, now Pat. No. 6,760,768, which is a continuation of application No. 09/127,280, filed on Jul. 31, 1998, now Pat. No. 6,272,538, which is a continuation-in-part of application No. 08/688,543, filed on Jul. 30, 1996, now Pat. No. 5,832,228.

(51) Int. Cl.
*G06F 13/00* (2006.01)
(52) U.S. Cl. .................. 709/225; 709/219; 709/227; 709/250
(58) Field of Classification Search ................ 709/217, 709/219, 227, 228, 236, 237, 250
See application file for complete search history.

(56) References Cited

U.S. PATENT DOCUMENTS

| 4,104,721 A | 8/1978 | Markstein et al. |
| 4,694,492 A | 9/1987 | Wirstrom et al. |
| 4,799,153 A | 1/1989 | Hann et al. |
| 4,882,752 A | 11/1989 | Lindman et al. |

(Continued)

FOREIGN PATENT DOCUMENTS

EP     0436799 A2     7/1991

OTHER PUBLICATIONS

Lu et al., "A Model for Multilevel Security in Computer Networks", IEEE Transactions on Software Engineering, Jun. 1990, pp. 647-659.

(Continued)

*Primary Examiner*—Viet Vu
(74) *Attorney, Agent, or Firm*—Gazdzinski & Associates, PC

(57) ABSTRACT

A computerized access device useful within a network and adapted to provide communication security. In one embodiment, the network comprises an untrusted network, and the access device comprises stand-alone network security apparatus adapted to create associations with other network security devices on the network. Traffic between the associated devices may be encrypted for e.g., data confidentiality and integrity protection. In one variant, the network security apparatus comprises a software entity disposed at least partly within the software stack of a stand-alone hardware device. In another variant, the device functions as a gateway or portal to another network (e.g., the Internet or another untrusted network), or to another device within the same network.

98 Claims, 3 Drawing Sheets

U.S. PATENT DOCUMENTS

| | | | |
|---|---|---|---|
| 4,885,789 A | 12/1989 | Burger et al. | |
| 4,896,319 A | 1/1990 | Lidinsky et al. | |
| 4,924,513 A | 5/1990 | Herbison et al. | |
| 4,962,449 A | 10/1990 | Schlesinger | |
| 5,032,979 A | 7/1991 | Hecht et al. | |
| 5,056,140 A | 10/1991 | Kimbell | |
| 5,075,884 A | 12/1991 | Sherman et al. | |
| 5,111,390 A | 5/1992 | Ketcham | |
| 5,113,499 A | 5/1992 | Ankney et al. | |
| 5,126,728 A | 6/1992 | Hall | |
| 5,163,147 A | 11/1992 | Orita | |
| 5,204,961 A | 4/1993 | Barlow | |
| 5,249,212 A | 9/1993 | Covey et al. | |
| 5,249,231 A | 9/1993 | Covey et al. | |
| 5,253,294 A | 10/1993 | Maurer | |
| 5,272,754 A | 12/1993 | Boerbert | |
| 5,276,735 A | 1/1994 | Boebert et al. | |
| 5,283,828 A | 2/1994 | Saunders et al. | |
| 5,287,519 A | 2/1994 | Dayan et al. | |
| 5,295,266 A | 3/1994 | Hinsley et al. | |
| 5,323,146 A | 6/1994 | Glaschick | |
| 5,361,359 A | 11/1994 | Tajalli et al. | |
| 5,369,702 A | 11/1994 | Shanton | |
| 5,369,707 A | 11/1994 | Follendore, III | |
| 5,375,244 A | 12/1994 | McNair | |
| 5,410,543 A | 4/1995 | Seitz et al. | |
| 5,414,833 A | 5/1995 | Hershey et al. | |
| 5,414,844 A | 5/1995 | Wang | |
| 5,416,842 A | 5/1995 | Aziz | |
| 5,442,702 A | 8/1995 | van Ooijen et al. | |
| 5,455,861 A | 10/1995 | Faucher et al. | |
| 5,473,696 A | 12/1995 | van Breemen et al. | |
| 5,511,122 A | 4/1996 | Atkinson | |
| 5,515,441 A * | 5/1996 | Faucher | 380/30 |
| 5,519,704 A | 5/1996 | Farinacci et al. | |
| 5,533,123 A * | 7/1996 | Force et al. | 713/189 |
| 5,535,276 A * | 7/1996 | Ganesan | 713/155 |
| 5,537,544 A | 7/1996 | Morisawa et al. | |
| 5,544,245 A * | 8/1996 | Tsubakiyama | 713/171 |
| 5,548,721 A | 8/1996 | Denslow | |
| 5,550,984 A | 8/1996 | Gelb | |
| 5,555,373 A | 9/1996 | Dayan et al. | |
| 5,557,742 A | 9/1996 | Smaha et al. | |
| 5,574,912 A | 11/1996 | Hu et al. | |
| 5,577,209 A | 11/1996 | Boyle et al. | |
| 5,586,260 A | 12/1996 | Hu | |
| 5,590,266 A | 12/1996 | Carson et al. | |
| 5,596,718 A | 1/1997 | Boebert | |
| 5,602,918 A * | 2/1997 | Chen et al. | 713/153 |
| 5,606,668 A | 2/1997 | Shwed | |
| 5,619,657 A | 4/1997 | Sudama et al. | |
| 5,623,601 A | 4/1997 | Vu | |
| 5,652,908 A | 7/1997 | Douglas et al. | |
| 5,680,461 A | 10/1997 | McManis | |
| 5,689,566 A | 11/1997 | Nguyen | |
| 5,692,124 A | 11/1997 | Holden et al. | |
| 5,708,655 A | 1/1998 | Toth et al. | |
| 5,712,914 A * | 1/1998 | Aucsmith et al. | 380/30 |
| 5,774,551 A * | 6/1998 | Wu et al. | 713/155 |
| 5,781,550 A | 7/1998 | Templin et al. | |
| 5,781,632 A | 7/1998 | Odom | |
| 5,784,566 A * | 7/1998 | Viavant et al. | 709/229 |
| 5,793,866 A | 8/1998 | Brown et al. | |
| 5,796,424 A | 8/1998 | Ely et al. | |
| 5,796,727 A | 8/1998 | Harrison et al. | |
| 5,826,014 A | 10/1998 | Coley et al. | |
| 5,828,832 A | 10/1998 | Holden et al. | |
| 5,832,228 A | 11/1998 | Holden et al. | |
| 5,835,724 A | 11/1998 | Smith | |
| 5,864,683 A | 1/1999 | Boebert et al. | |
| 5,889,866 A | 3/1999 | Cyras et al. | |
| 5,896,499 A | 4/1999 | McKelvey | |
| 5,898,784 A | 4/1999 | Kirby et al. | |
| 5,905,736 A | 5/1999 | Ronen et al. | |
| 5,940,591 A | 8/1999 | Boyle et al. | |
| 5,963,915 A | 10/1999 | Kirsch | |
| 5,983,350 A | 11/1999 | Minear et al. | |
| 6,003,084 A | 12/1999 | Green et al. | |
| 6,070,198 A | 5/2000 | Krause et al. | |
| 6,088,450 A | 7/2000 | Davis et al. | |
| 6,088,451 A | 7/2000 | He et al. | |
| 6,141,758 A | 10/2000 | Benantar et al. | |
| 6,226,383 B1 * | 5/2001 | Jablon | 380/30 |
| 6,272,538 B1 | 8/2001 | Holden et al. | |
| 6,272,639 B1 | 8/2001 | Holden et al. | |
| 6,282,652 B1 | 8/2001 | Scheifler | |
| 6,408,336 B1 | 6/2002 | Schneider et al. | |
| 6,643,698 B2 | 11/2003 | Holden et al. | |
| 6,760,768 B2 | 7/2004 | Holden et al. | |
| 6,993,582 B2 | 1/2006 | Holden et al. | |
| 7,475,137 B2 | 1/2009 | Holden et al. | |
| 2005/0010766 A1 | 1/2005 | Holden et al. | |

OTHER PUBLICATIONS

Jan Watts, Network Communications (OSI Model); PC-Computing, v4, No. 1, p. 164 (2); Jan. 1991.

Scott Palmer, Microsoft 0S-2 to Conform to Posix, C2 Security Level; Fed. Comp. Week; v3, No. 15, p. 6(1); Apr. 10, 1989 (abstract).

Bob Mitze, Security Through Software (Unix System V/MLS Multi-Level Security O/S); Exe, v4, No. 6, p. 53 (1); Nov. 1989, 2 pages.

D.D. Schnackenberg, "Development of a Multilevel Secure Local Area Network" from the proceedings of the 8th National Computer Security Conference on Sep. 30, 1985, pp. 97-101.

Junior Nagaki et al., "Integration of Digital, Voice and Video Data on a Multi-level Secure Fiber Optic Network", MILCOM, Oct. 21, 1985, 5 pages.

Phillip C. Stover, "Designing Multilevel Secure Networks" Boeing Aerospace Company.

Morrie Grasser et al., "The Digital Distributed System Security Architecture" 1990 IEEE Conference on Security and Privacy, pp. 305-319.

Data Sheet, published by the National Computer Security Center at Fort Meade, Maryland, dated Jul. 25, 1990, describing the Verdix Secure Local Area Network (VSLAN), 10 pages.

"NCR Unveils Top End; Distributed Transaction Processing Management System Brings Mainframe-Class OLTP to Open Systems" (Online Transaction Processing), published Jan. 28, 1991, in the Work Group Computing Report, 2 pages.

Jan P. Kruys, "Security of Open Systems", Computers and Security 8 (1989), pp. 139-147.

J.M. Rushby et al., "A Distributed Secure System", IEEE, 1983, pp. 127-135.

Ruth Nelson et al., "SDNS Architecture and End-to-End Encryption", of GTE Government System Corporation Electronic Defense Communications Division dated 1989, pp. 356-366.

V.L.. Voydock et al., "Security Mechanisms in High-Level Network Protocols", published in Computing Surveys, vol. 15, No. 2, Jun. 1983, pp. 135-171.

R. Atkins, "IP Authentication Header", Naval Research Laboratory, Aug. 1995, 13 pages.

R. Atkins, "IP Encapsulating Security Payload (ESP)",Naval Research Laboratory, Aug. 1995, 10 pages.

Kent, et al., "RFC 2401—Security Architecture for the Internet Protocol", Network Working Group, Nov. 1998, 51 pages.

G. Lawton, "S/WAN Swims Along", SunWorld, Jun. 1996, 7 pages.

Maughan, et al., Internet Security Association and Key Management Protocol (ISAKMP), Network Working Group, Nov. 1998, 81 pages.

Dinkel, et al., "Prototyping SP4 a Security Data Network System Transport Protocol Interoperability Demonstration Project", NISTIR 90-4228, 1990, 20 pages.

"Toshiba's Cryptogate Software Enables Creation of Virtual Private Networks" Technology, Feb. 5, 1997, 2 pages.

Pau-Chen Cheng et al., "On the Formal Specification and Verification of a Multiparty Session Protocol," IEEE, 1990, pp. 216-233.
U.S. Appl. No. 11/776,406, Holden et al.
U.S. Appl. No. 11/776,417, Holden et al.
U.S. Appl. No. 11/776,418, Holden et al.
U.S. Appl. No. 11/776,413, Holden et al.
U.S. Appl. No. 11/776,421, Holden et al.
U.S. Appl. No. 11/776,396, Holden et al.
U.S. Appl. No. 11/776,424, Holden et al.
U.S. Appl. No. 11/776,461, Holden et al.
U.S. Appl. No. 11/776,471, Holden et al.
IEEE Journal on "Selected Areas in Communications"; Feb. 1989; vol. 7, No. 2; 9 pages.
Proceeding of Tri Com '91; IEEE Conference on Communications Software: Communications for Distributed Applications and Systems; Apr. 18-19, 1991; 17 pages.
NTIS; Secure Computer Network; Nov. 1982; 118 pages.
Office Action dated Dec. 17, 2008 for U.S. Appl. No. 11/776,406.
Office Action dated Apr. 6, 2009 for U.S. Appl. No. 11/776,417.
Office Action dated Jan. 30, 2009 for U.S. Appl. No. 11/776,418.
Office Action dated Mar. 12, 2009 for U.S. Appl. No. 11/776,413.
Office Action dated Mar. 11, 2009 for U.S. Appl. No. 11/776,421.
Office Action dated Dec. 17, 2008 for U.S. Appl. No. 11/776,396.
Office Action dated Jan. 2, 2009 for U.S. Appl. No. 11/776,424.
Office Action dated Jan. 2, 2009 for U.S. Appl. No. 11/776,461.
Office Action dated Jan. 2, 2009 for U.S. Appl. No. 11/776,471.

* cited by examiner

COMPUTERIZED ACCESS DEVICE WITH NETWORK SECURITY

RELATED APPLICATIONS

The present application is a continuation of U.S. patent application Ser. No. 10/877,791, filed Jun. 25, 2004, which is a continuation of U.S. patent application Ser. No. 09/924,214, filed on Aug. 7, 2001, now U.S. Pat. No. 6,760,768, issued on Jul. 6, 2004, which is a continuation of U.S. patent application Ser. No. 09/127,280, filed on Jul. 31, 1998, now U.S. Pat. No. 6,272,538, issued on Aug. 7, 2001, which is a continuation-in-part of U.S. application Ser. No. 08/688,543, filed Jul. 30, 1996, now U.S. Pat. No. 5,832,228, issued on Nov. 3, 1998; and related to U.S. Pat. No. 5,577,209, entitled APPARATUS AND METHOD FOR PROVIDING MULTI-LEVEL SECURITY FOR COMMUNICATION AMONG COMPUTERS AND TERMINALS ON A NETWORK, issued to Boyle et al., Nov. 19, 1996, each of which is hereby incorporated herein by reference in its entirety.

The present application is also related to the following applications filed on even date herewith, each of which is hereby incorporated herein by reference in its entirety:

U.S. patent application Ser. No. 11/776,406, entitled "PORTABLE COMMUNICATIONS DEVICE WITH ENHANCED SECURITY";

U.S. patent application Ser. No. 11/776,417, entitled "METHODS FOR PROVIDING SECURITY FOR AD HOC NETWORKED COMPUTERIZED DEVICES";

U.S. patent application Ser. No. 11/776,418, entitled "PORTABLE COMPUTERIZED DEVICE ADAPTED FOR AD HOC SECURITY ASSOCIATIONS";

U.S. patent application Ser. No. 11/776,413, entitled "SYSTEM FOR PROVIDING SECURITY FOR AD HOC NETWORKED COMPUTERIZED DEVICES";

U.S. patent application Ser. No. 11/776,421, entitled "SYSTEM FOR PROVIDING SECURITY IN A NETWORK COMPRISING COMMUNICATIONS DEVICES";

U.S. patent application Ser. No. 11/776,396, entitled "METHODS OF OPERATING A PORTABLE COMMUNICATIONS DEVICE WITH ENHANCED SECURITY";

U.S. patent application Ser. No. 11/776,424, entitled "SYSTEM FOR PROVIDING SECURITY IN A NETWORK COMPRISING COMPUTERIZED DEVICES";

U.S. patent application Ser. No. 11/776,461, entitled "PORTABLE COMPUTERIZED DEVICE WITH NETWORK SECURITY"; and U.S. patent application Ser. No. 11/776,471, entitled "METHOD AND SYSTEM FOR ESTABLISHING A SECURITY PERIMETER IN COMPUTER NETWORKS".

BACKGROUND OF THE INVENTION

1. Field of the Invention

The present invention relates in general to secure and multi-level secure (MLS) networks and in particular to a system and method for providing security and multi-level security for computer devices utilized in non-secure networks.

2. Description of the Related Art

Multi-level secure (MLS) networks provide a means of transmitting data of different classification levels (i.e., Unclassified, Confidential, Secret and Top Secret) over the same physical network. To be secure, the network must provide the following security functions: data integrity protection, separation of data types, access control, authentication and user identification and accountability.

Data integrity protection ensures that data sent to a terminal is not modified en route. Header information and security level are also protected against uninvited modification. Data integrity protection can be performed by check sum routines or through transformation of data, which includes private key encryption and public key encryption.

Separation of data types controls the ability of a user to send or receive certain types of data. Data types can include voice, video, E-Mail, etc. For instance, a host might not be able to handle video data, and, therefore, the separation function would prevent the host from receiving video data.

Access control restricts communication to and from a host. In rule based access control, access is determined by the system assigned security attributes. For instance, only a user having Secret or Top Secret security clearance might be allowed access to classified information. In identity based access control, access is determined by user-defined attributes. For instance, access may be denied if the user is not identified as an authorized participant on a particular project. For control of network assets, a user may be denied access to certain elements of the network. For instance, a user might be denied access to a modem, or to a data link, or to communication on a path from one address to another address.

Identification of a user can be accomplished by a unique name, password, retina scan, smart card or even a key for the host. Accountability ensures that a-specific user is accountable for particular actions. Once a user establishes a network connection, it may be desirable that the user's activities be audited such that a "trail" is created. If the user's actions do not conform to a set of norms, the connection may be terminated.

Currently, there are three general approaches to providing security for a network: trusted networks, trusted hosts with trusted protocols, and encryption devices. The trusted network provides security by placing security measures within the configuration of the network. In general, the trusted network requires that existing protocols and, in some cases, physical elements be replaced with secure systems. In the Boeing MLS Lan, for instance, the backbone cabling is replaced by optical fiber and all access to the backbone is mediated by security devices. In the Verdix VSLAN, similar security devices are used to interface to the network, and the network uses encryption instead of fiber optics to protect the security of information transmitted between devices. VSLAN is limited to users on a local area network (LAN) as is the Boeing MLS Lan.

Trusted hosts are host computers that provide security for a network by reviewing and controlling the transmission of all data on the network. For example, the U.S. National Security Agency (NSA) has initiated a program called Secure Data Network System (SDNS) which seeks to implement a secure protocol for trusted hosts. In order to implement this approach, the installed base of existing host computers must be upgraded to run the secure protocol. Such systems operate at the Network or Transport Layers (Layers 3 or 4) of the Open Systems Interconnection (OSI) model.

Encryption devices are used in a network environment to protect the confidentiality of information. They may also be used for separation of data types or classification levels. Packet encryptors or end-to-end encryption (EEE) devices, for instance, utilize different keys and labels in protocol headers to assure the protection of data. However, these protocols lack user accountability since they do not identify which user of the host is using the network, nor are they capable of preventing certain users from accessing the network. EEE devices typically operate at the Network Layer (Layer 3) of the OSI model. There is a government effort to develop cryptographic protocols which operate at other protocol layers.

An area of growing concern in network security is the use of computer devices in non-secure networks. Such computer devices often include valuable information, which may be lost or stolen due to these computers being accessed through the non-secured network. In light of this problem, a number of related products have been developed. The products developed include Raptor Eagle, Raptor Remote, Entrust, Secret Agent and Veil. Although, these products serve the same purpose, a number of different approaches have been utilized. For example, Raptor Eagle, Raptor Remote, and Veil implement these products as software instantiations. While Entrust and Secret Agent utilize hardware cryptographic components. Additionally, Raptor products are also application independent.

A problem with the above described products is that none are based upon the use of highly trusted software. Veil is an off-line encryption utility, which cannot prevent the inadvertent release of non-encrypted information. While Raptor Eagle and Raptor Remote are based on software instantiations and thus cannot be verified at the same level of assurance. Secret Agent and Entrust while hardware based are dependent upon the development of integration software for specific applications.

It is therefore, an objective of the present invention to provide a multi-level security system that is readily adaptable to computer devices to provide an adequate level of security assurances.

SUMMARY OF THE INVENTION

In a first aspect of the invention, an access device is disclosed. In one embodiment, the access device comprises network security apparatus and an associated software stack. The security apparatus is operative to establish associations with other network entities (e.g., portable computers) over an intervening (e.g., untrusted) network. Data sent pursuant to the association is sealed (e.g., encrypted) in order to provide integrity and confidentiality protection.

In one variant, the security apparatus comprises computer software disposed within the software stack of the access device; e.g., below the network layer.

In another variant, the security apparatus is further adapted to communicate with the computer software to, inter alia, generate cryptographic elements such as public/private keys or key pairs.

In yet another variant, the other network entities comprise an untrusted operating system. In another variant, the access device comprises an address resolving protocol that can resolve hardware or network addresses from e.g., IP addresses, or vice versa. One exemplary hardware or network address comprises a 48-bit address, or Ethernet address.

In another aspect of the invention, a portal device is disclosed. In one variant, the portal is in communication with one or more devices via a data network and further adapted to provide network security functions, and comprises a software stack operative to run on the portal device; and network security apparatus for use with the stack. The security apparatus is adapted to communicate data between a second network security apparatus resident on an untrusted computerized device (e.g., portable computer) on the data network and the one or more devices also located on the data network, and is operative to establish an ad hoc and temporary association between the portal device and the second network security apparatus of the computerized device.

In another embodiment, the access portal comprises a host computerized device, and a first computer program operative to run on the host computerized device to establish an ad hoc security association between the portal and a portable computer device.

In one variant, the first computer program comprising a key exchange algorithm adapted to cause the portal and the portable device to exchange respective cryptographic keys generated substantially while establishing the association, the keys being substantially unique to the association, the establishment of the association further comprising at least authentication of the portable device to the portal.

In another variant, a second computer program is provided that is operative to run on the host computer and adapted to decrypt data sent to the portal using at least one of the cryptographic keys. A third computer program operative to run on the host computer and adapted to evaluate the encrypted data sent from the portable device for at least data integrity using cryptographic residues generated by both the portable device and the residue is also used.

In still another variant, the portal acts as a gateway to a second (and optionally other) computer networks, such as the Internet.

DETAILED DESCRIPTION OF THE PREFERRED EMBODIMENTS

Figure 1:
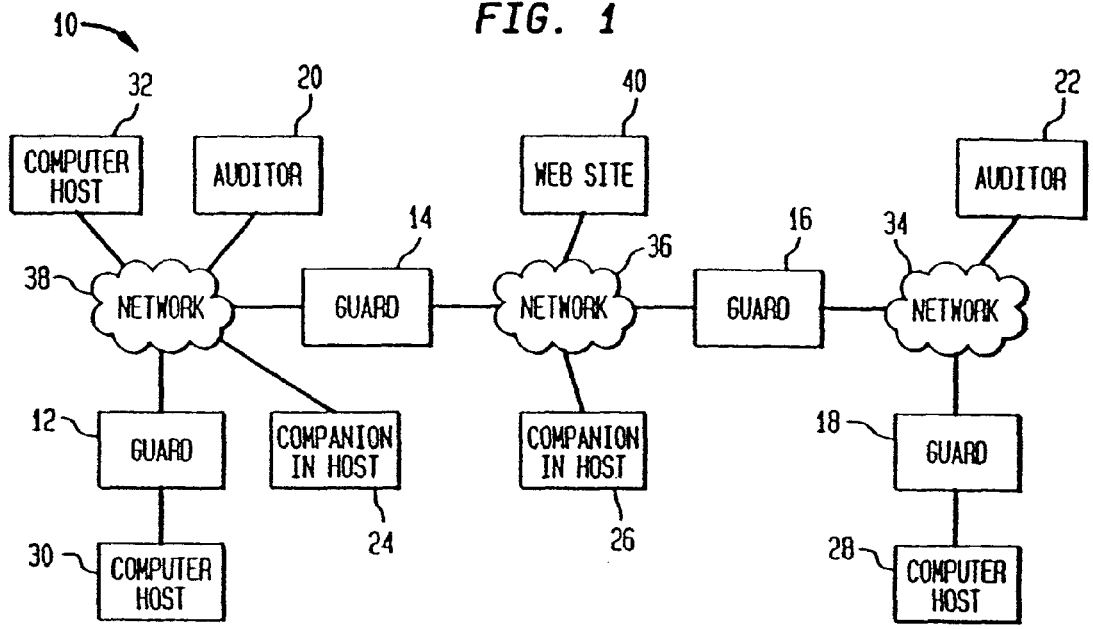
FIG. 1 is a schematic diagram of an MLS network system in accordance with the present invention.

The present invention is directed to a secure network interface unit (SNIU), which is utilized to control communications between a user such as a computer host and a network. The SNIU intercepts Internet Protocol (IP) datagrams as they are transmitted between the user and the network. The SNIU determines whether each datagram from the user is releasable to the network and if and how it should be encrypted. The SNIU decrypts each datagram from the network and determines whether it is releasable to the user. When a SNIU releases a datagram from a lower classification user or network to a higher classification user or network (i.e., a write up), the datagram is used to predict the expected response. When a datagram is received from the higher classification user or network, the SNIU compares the datagram to the response which was predicted during the write up and, only if they match, releases it (i.e., allows the write down) to the lower classification user or network. The SNIU implements a custom Trusted Session Protocol (TSP) to establish associations (described later) prior to permitting any communication between a user and a network. The TSP authenticates users, exchanges security parameters between SNIUs, and establishes encryption keys for an association. This method of providing security allows existing network assets and existing network protocols to continue to be used, thereby avoiding the need to replace an installed network base for implementation of the multi-level security system. The connected host or user equipment and the network backbone are therefore not required to be secure (trusted).

The SNIU according to the present invention can be configured in a number of different embodiments depending on the particular physical locations and forms of implementation. These embodiments include a standalone hardware SNIU ("Guard") and a software SNIU ("Companion").

The hardware embodiment of the SNIU is implemented as a stand alone hardware device. Such a configuration is desirable, since the Guard SNIU is highly trusted. The Guard SNIU is configured to be inserted between existing hosts and a network. The SNIU is transparent to the host, and any legacy system or application software running on the host. The Guard SNIU provides protection for any host connected to an IP based network. There is no requirement that the attached host computers run a trusted operating system. The Guard SNIU provides a trusted boundary between the protected hosts and the unprotected network. Protected means that the connection is with another known SNIU (a unique digital signature identifies the SNIU), the messages are confidential (encrypted) and unaltered (cryptographic residues validate the packet).

The software embodiment of the SNIU is implemented primarily as a software function resident in and executed from the host machine. The only hardware required is a commercially available cryptographic card (e.g., a Fortezza card) which plugs into the host computer's PCMCIA card reader, for example. Such a configuration is desirable, since the Companion SNIU is designed to be installed in-existing portable computers, which avoids the additional cost of additional hardware required by a Guard SNIU. The Companion SNIU provides the same network security features as the stand alone SNIU when the host computer is connected to home enterprise's network. The software SNIU also extends that same level of security across the Internet (or any other unprotected network) when the user is on the road and is remotely communicating with the enterprise network or other remotely located computer devices including a similar Companion SNIU.

The Companion SNIU provides all of the functionality and security of the Guard SNIU as well as complete interoperability with these devices. The software comprising the Companion SNIU is based on the same software utilized in the Guard SNIU. The user of the Companion SNIU however, assumes an acceptable risk in exchange for not requiring additional hardware required by a Guard SNIU, which cannot be circumvented or corrupted via attacks originating from external hardware. By providing reasonable software protection (not allowing unauthorized personnel physical access) and software protection (anti-virus protection), a Companion SNIU can be utilized providing the user with an acceptable level of risk. If the user is confident that the software comprising the Companion SNIU is not circumvented or modified, then he can enjoy the same degree of confidence as the user of a Guard SNIU device.

Referring to FIG. 1, there is shown an example of a Multi-Level Security (MLS) System in accordance with the present invention. This system 10 incorporates the various embodiments of the SNIUs (GuardS and CompanionS) in order to provide MLS for computer networks such as the Internet. For example, the guard devices 14, 16 which are hardware embodiments of the SNIU are coupled between computer networks 34, 36, 38 providing inter-network security. Additional guard devices 12, 18 are coupled between users such as computer hosts 28 and 30, and the respective networks 34 and 38. The software embodiment of the SNIU are implemented as companions within computer hosts 24, 26, which provides network security without requiring additional hardware. The auditors 20, 22 are also Guard SNIUs which are configured to communicate directly with the other SNIUs (GuardS and CompanionS) to log audit events and potentially signal alarms. The above described system 10 enables secured, and non-secured users such as a web site 40, to communicate with each other without the danger of compromising security.

During operation, the SNIUs included in the above described system 10 communicate with each other thereby creating a global security perimeter for end-to-end communications and wherein the network may be individually secure or non-secure without compromising security of communications within the global security perimeter.

System Security Policies

The SNIU devices in accordance with the present invention may implement a number of security policies suitable to the circumstances of a given network environment. The major policy areas are: discretionary access control; mandatory access control; object reuse; labeling; identification and authentication; audit; denial of service detection; data type integrity; cascading control; and covert channel use detection.

Discretionary access control is a means of restricting access to objects (data files) based on the identity (and need to know) of the user, process, and/or group to which the user belongs. It may be used to control access to user interface ports based on the identity of the user. For a single-user computer unit, this mechanism may be implemented in the SNIU, whereas for a multi-user host, the DAC control may be implemented at the host machine. Discretionary access control may also be implemented as discretionary dialog addressing, wherein the addressing of all communications originated by a user is defined, and for user discretionary access denial, wherein a user may refuse to accept a communication from another user.

Mandatory access control is a means of restricting access to objects based on the sensitivity (as represented by a classification label) of the information contained in the objects, and the formal authorization (i.e., clearance) of the user to access information of such sensitivity. For example, it may be implemented as dialog lattice-based access control, wherein access requires a correct classification level, integrity level, and compartment authorization, dialog data-type access control, wherein correct data type authorization is required for access, and cascade protection, wherein controls are provided to prevent unauthorized access by cascading user access levels in the network.

Object reuse is the reassignment and reuse of a storage medium (e.g., page frame, disk sector, magnetic tape) that once contained one or more objects to be secured from unauthorized access. To be secured, reused, and assigned to a new subject, storage media must contain no residual data from the object previously contained in the media. Object reuse protection may be implemented by port reuse protection, session reuse protection, dialog reuse protection, and/or association reuse protection.

Labeling requires that each object within the network be labeled as to its current level of operation, classification, or accreditation range. Labeling may be provided in the following ways: user session security labeling, wherein each user session is labeled as to the classification of the information being passed over it; dialog labeling, wherein each dialog is labeled as to the classification and type of the information being passed over it; and host accreditation range, wherein each host with access to the secured network is given an accreditation range, and information passing to or from the host must be labeled within the accreditation range.

Identification is a process that enables recognition of an entity by the system, generally by the use of unique user names. Authentication is a process of verifying the identity of a user, device, or other entity in the network. These processes may be implemented in the following ways: user identification; user authentication; dialog source authentication, wherein—the source of all communication paths is authenticated at the receiving SNIU before communication is allowed; SNIU source authentication, wherein the source SNIU is authenticated before data is accepted for delivery; and administrator authentication, wherein an administrator is authenticated before being allowed access to the Security Manager functions.

An audit trail provides a chronological record of system activities that is sufficient to enable the review of an operation, a procedure, or an event. An audit trail may be implemented via a user session audit, a dialog audit, an association audit, an administrator audit, and/or a variance detection, wherein audit trails are analyzed for variance from normal procedures.

Denial of service is defined as any action or series of actions that prevent any part of a system from functioning in accordance with its intended purpose. This includes any action that causes unauthorized destruction, modification, or delay of service. The detection of a denial of service may be implemented for the following conditions: user session automatic termination, such as when unauthorized access has been attempted; user machine denial of service detection, such as detection of a lack of activity on a user machine; dialog denial of service detection; association denial of service detection, such as detection of a lack of activity between SNIUs; and/or data corruption detection, such as when an incorrect acceptance level is exceeded.

Covert channel use is a communications channel that allows two cooperating processes to transfer information in a manner that violates the system's security policies. Detection of covert channel use may be implemented, for example, by delay of service detection, such as monitoring for unusual delays in message reception, or dialog sequence error detection, such as monitoring for message block sequence errors.

Details of the Software (Companion) SNIU

Figure 2:
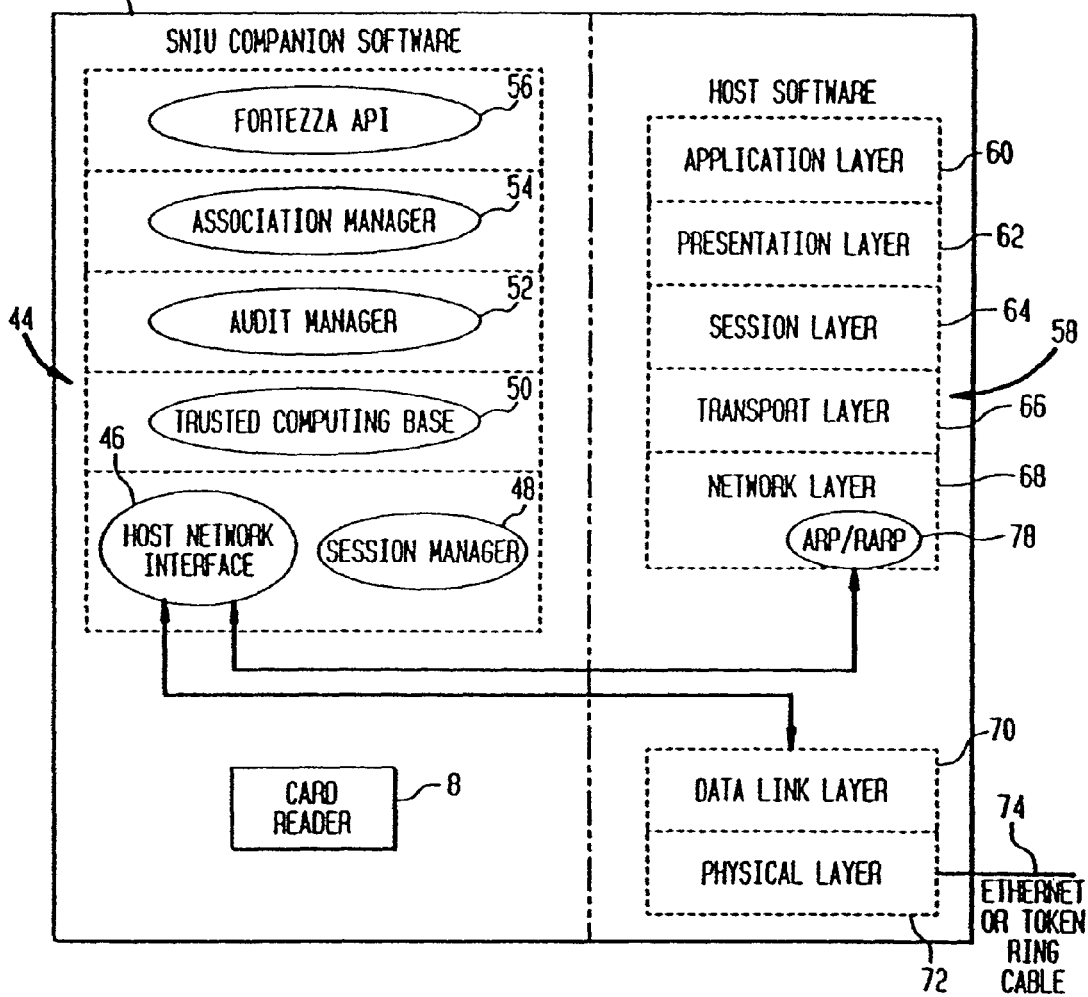
FIG. 2 is a block diagram of the software SNIU installed in a computer host in accordance with the present invention.

Referring to FIG. 2, a block diagram of the Companion SNIU installed in a computer host is shown. The Companion SNIU 44 is implemented as a software function within a host computer 42. The SNIU 42 interfaces with the communications stack of the host computer 58 in order to send and receive messages over the Ethernet or token ring cable 74. The communications stack 58 is a typical OSI model including a physical 72, data link layer 70, network layer 68, transport layer 66, session layer 64, presentation layer 62 and application layer 60. The network layer 68 includes an ARP/RARP module which is utilized to process Address Resolution Protocol (ARP) and Reverse Address Resolution Protocol (RARP). As can be seen from FIG. 2, the SNIU 44 is installed such that it is transparent to other high order software.

The main modules of the SNIU include a Host/Network Interface 46, Session Manager 48, Audit Manager 52, Association Manager 54 and Fortezza API 56. The primary data structures included in the SNIU are the Association Table, Sym_Key Table, Certificate Table, Waiting Queue and Schedule Table. These data structures are described later in the description of the protocol.

The Host/Network Interface 46 provides the interfacing between the SNIU 44 and communications stack 58. The Fortezza API 56 is a driver for the card reader 8 included in the host computer 42. The card reader 8 is adapted to receive a Fortezza card which is a PCMCIA card configured to perform integrity and authenticating functions, for example. The Fortezza card performs the integrity function by encrypting messages leaving the SNIU 44 and decrypting incoming messages. The authentication function is accomplished by the Fortezza card generating and reading digital signatures which are unique to each SNIU. The Fortezza card includes a private key to generate the digital signature and a public key to read the signatures. The other SNIU modules will be described in conjunction with data flow diagram of FIG. 3.

Figure 3:
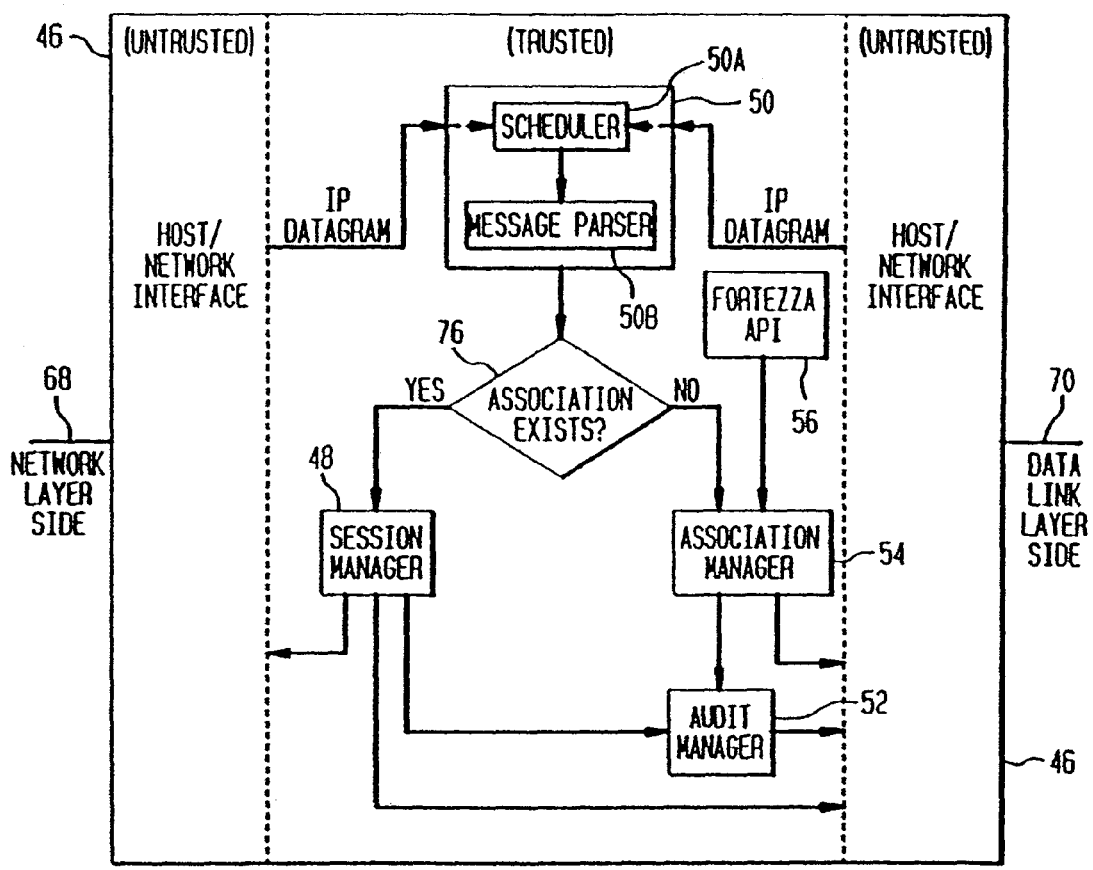
FIG. 3 is a data flow diagram for the software SNIU in accordance with the present invention.

Referring to FIG. 3, there is shown a data flow diagram for the software SNIU. When the host computer communicates with another computer over a network, the communications protocol stack within the computer processes the data to be transmitted. If a user on the computer is transmitting a file to another computer, the user may select the file to send by interacting with application layers software. The display which the user sees is controlled by presentation layer software.

Session layer software checks the users permission codes to determine if the user has access to the file. Transport layer software prepares Internet Protocol Datagrams containing blocks of file data and determines that the transmitted file data is properly received and acknowledged or is re-transmitted.

The Host/Network interface 46 is utilized to intercept the data packets transmitted between the network and data link layers 68, 70. The interface 46 is utilized to format the data packets into an appropriate format depending on whether the data packet is incoming or out going. The interface 46 accomplishes this by removing the hardware address header when it receives a data packet and re-applies the same header when the packet is released (even if the underlying IP address header was changed). Since the interface in the software SNIU 46 does not handle ARP and RARP message for the host computer, it can be smaller than the one utilized in the hardware SNIU. The ARP/RARP module included in the network layer 68 performs this function.

When the untrusted Host/Network Interface 46 completes re-assembling an IP datagram from a host computer, the datagram is passed to the Trusted Computing Base (TCB) of the SNIU for processing. The TCB is the collection of hardware and software which can be trusted to enforce the security policy. In the SNIU Guard the trusted Scheduler software module controls the hardware which controls access to memory and guarantees that IP datagrams are not passed directly from the host-side Host/Network Interface module to the network-side Host/network interface module or vice versa. Rather each IP datagram is passed to the SNIUs other trusted software modules (Message Parser, Association Manager, Session Manager, etc.) which determine if the IP datagram is allowed to pass through the SNIU and if it is encrypted/decrypted.

In a SNIU companion the hardware is controlled by the host's operating system software and not the SNIU's Scheduler module. Therefore, the SNIU Companion is inherently not as trust worthy as the SNIU Guard even though most of the software is identical.

The Message Parser 50B is the first module in the TCB which processes an IP datagram received from the host computer. The Message Parser 50B checks the Association Table 76 and determines whether or not an association already exists for sending the datagram to its destination. If no association exists, the datagram is stored on the Waiting Queue and the Association Manager 54 is called to establish an association between this SNIU and the SNIU closest to the destination host. If an association does exist, the Session Manager 48 is called to encrypt the datagram, check security rules, and send the encrypted Protected User Datagram (POD) to the peer SNIU.

When the Association Manager 54 is called, it prepares two messages to initiate the association establishment process. The first message is an Association Request Message which contains the originating host computer level and this SNIU's certificate (containing it's public signature key). This message is passed to the Fortezza API 56 which controls. The Fortezza card which signs the message with this SNIU's private signature key. The second message is a message intended to evoke a response from the destination computer, ("Ping"), such as an ICMP Echo Request message which will be returned to this SNIU if it is received by the destination host. Both messages are passed to the network-side Host/Network Interface Module 46 to be transmitted to the destination host.

If another SNIU exists on the network between the originating SNIU and the destination host, the messages are first processed by the SNIU's receiving port's Host/Network Interface 46 which reassembles the messages and passes them to the trusted software. The Message Parser module 50B passes the Association Request Message to the Association Manager 54 module and deletes the ping. The Association Manager 54 passes the message to the Fortezza API 56 which verifies the digital signature. If not valid, the Audit Manager 52 is called to generate an Audit Event Message to log the error. If the signature is valid, the Association Manager 54 saves a copy of the received Association Request Message in the Waiting Queue, adds this SNIU's certificate to the message, calls the Fortezza API 56 to sign the message, generates a new ping, and passes both messages to the Host/Network Interface module 46 to transmit the messages to the destination host. If the messages are received by any other SNIU's before reaching the destination host, this process is repeated by each SNIU.

If the destination host computer does not contain the Companion SNIU software, the host's communications protocol stack software automatically responds to the message intended to evoke a response from it, for example it converts the ping message to a reply message (ICMP Echo Reply) and returns it to the SNIU which sent it. However, the destination host does not contain any software which can process the Association Request Message; so it is ignored (i.e., deleted).

If the destination host computer does contain Companion SNIU software, the host's data link layer software converts the stream of bits from the physical layer into packets which are passed to the Companion's Host/Network Interface module 46. The hardware address headers are stripped off of the packets and saved; and the packets are re-assemble into IP datagrams which are passed to the Message Parser 50B. The ping message is ignored; and the Association Request Message is passed to the Fortezza API 56 to have the signature verified. If valid, the message is passed to the Association Manager module 54 which saves the originating host and SNIU data and generates an Association Grant Message. This message contains the SNIU's IP address (which is the same as the destination host's), the SNIU's certificate, the host's security level, and sealer keys for the originating SNIU and the previous intermediate SNIU (if there was one). The sealer keys (a.k.a. Message Encryption Keys) are explained elsewhere.

The Fortezza API 56 is then called to sign the message which is passed to the Host/Network Interface module 46. The Association Grant Message is converted from an IP datagram to network packets and passed back to the host's hardware packet drivers (in the data link layer) for transmission back to the originating host.

Any intermediate SNIU's which receive the Association Grant Message process the message up through the communications stack protocol layers and which calls the Message Parser 50B to process the message. The signature on the message is verified by the Fortezza API 56 and audited via the Audit Manager 52 if not valid. Otherwise, the validated message is processed by the Association Manager 54 module which removes and saves one of the sealer keys (a.k.a. a release key) which will be used by this SNIU and the previous SNIU (which generated the key) to authenticate PUD messages exchanged via this association in the future. The Fortezza API 56 is called to generate and wrap another sealer key to be shared with the next SNIU in the association path. The new key and this SNIU's certificate are appended to the message. The Fortezza API 56 aligns the message. The Host/Network Interface 46 transmits the message on its way back to the originating SNIU.

The originating SNIU re-assembles the Association Grant Message via the physical, data link 70, and network layers 68 as previously described. The signature is validated and audited if necessary. If valid, the Association Manager 56 uses the Fortezza API to unwrap the sealer key(s). If two keys are in the received message, the bottom key is a release key to be shared with the first intermediate SNIU; and the top key is an association key to be shared with the peer SNIU (which granted the association). If there is only one key, it is the association key which is shared with the peer SNIU; and the association path does not contain any intermediate SNIUs. Once the keys are stored and the Association Table 76 is updated, the association is established and the Session Manager 48 is called to transmit the original user datagram which was stored in the waiting Queue prior to issuing the Association Request Message.

The Session Manager 48 enforces the security policy, determines whether IP datagrams received from host computers can be transmitted via the network to their destination host, encapsulates these user datagrams in PUDs using the sealer keys for the appropriate association. The security policy is enforced by comparing the security levels of the host and destination. If the security level of the destination is at least as great as that of the host computer, the Session Manager checks the Association Table and identified the appropriate peer SNIU and sealer key(s). The user datagram is encrypted by the Fortezza API 56 using the association key. If the association contains any intermediate SNIUs, the Fortezza API 56 calculates a message authorization code using the release key. The Session Manager 48 creates a PUD addressed from this SNIU to the peer SNIU, encloses the encrypted user datagram, appends the message authorization code (if any), and passes the new datagram to the Host/Network Interface module 46 on the network-side of the SNIU. The datagram is broken into packets and transmitted as previously described.

If an intermediate SNIU receives the PUD, the data is passed through the data link layer software 70 to the network layer where the re-assembled datagram is passed to the Session Manager 48. The source IP address is to identify the release key which is shared with the previous SNIU. The Fortezza API 56 uses the release key to verify the message authorization code. If not valid, the Session Manager 48 deletes the datagram and calls the Audit Manager 52 to generate an Audit Event Message. If the code is valid, it removes the code from the datagram, and uses the destination IP address to identify the release key shared with the next SNIU.

The Fortezza API 56 generates a new message authorization code. The Session Manager 48 appends the new code and passes the datagram to the opposite port's Host Network Interface module.

When the peer SNIU (i.e., the destination IP address) received the PUD and it has been reassembled into a datagram, the Message Parser 50B passes the datagram to the Session Manager 48. The source IP address is used to identify the corresponding association key. The Fortezza API 56 decrypts the original user datagram. The Session Manager checks the message authorization code and the security levels of the source and destination hosts. If the code is valid (i.e., the message was not modified during transmission over the network) and the security levels match, the decrypted datagram is passed to the Host/Network Interface 46 to be released to the destination host. If either is not correct, the Audit Manager 52 is called.

Associations

To establish trust between pairs of SNIUs, within an Internet protocol (IP) based network, the present SNIU uses associations. An association is a sharing of trusted information developed within the SNIU on an as needed basis. The SNIU discovers the trusted information it needs, when it needs it. There is no need for pre-positioned network configuration data. The SNIU uses custom messages and existing protocols to determine the existence of other SNIUs and hosts, and maintains that information, each called an association, as long as it is needed and unchanged. The SNIUs establish an association which provides a trusted communications path for a period of variable duration between the SNIUs. While an association is open, the two SNIUs use the association's security parameters to make security decisions for each Internet protocol (IP) packet of information exchanged.

When a host behind a SNIU attempts to communicate with someone else over the network, the SNIU transmits an Association Request Message and a message intended to evoke a response from a destination which is not a SNIU according to the present invention ("Ping" message), to the destination. The Association Request Message is used to identify other SNIUs in the communications path.

Each SNIU which receives the Association request message authenticates the message, sends it and a new Ping on to the destination. The SNIU which receives the Reply message to the Ping is the terminating SNIU (i.e., closest to the destination) in the potential association's communications path. This SNIU determines if the association should be permitted, i.e., would not violate the global or local security policy. The terminating SNIU creates an Association Grant Message, inserts its security parameters, and sends it back to the originating SNIU. When the originating SNIU receives the Association Grant Message, it authenticates the message.

Address Resolution Messages

Address Resolution Protocol (ARP) allows a host to find the hardware address of another host on the same network, given its IP address. The host broadcasts an ARP Request message which contains its hardware and IP addresses and the IP address of the target host. The target host (or an intermediate gateway) returns to the requesting host an ARP Response message which contains the hardware address of the target host (or the gateway).

Reverse Address Resolution Protocol (RARP) allows a host which only knows its hardware address to obtain an IP address from the network. The host broadcasts a RARP Request which contains its hardware address and a server on the network, returns a RARP Response containing an IP address assigned to the requester's hardware address.

All ARP and RARP messages have the same format and are contained within the frame data area of a single Ethernet frame (they are not IP datagrams). According to Douglas E. Corner, the format is as follows:

| 0 | 8 | 16 | 24 | 31 |
|---|---|---|---|---|
| HARDWARE TYPE | | PROTOCOL TYPE | | |
| HLEN | PLEN | OPERATION | | |
| SENDER'S HA (bytes 0-3) | | | | |
| SENDER'S HA (bytes 4-5) | | SENDER'S IP (bytes 0-1) | | |
| SENDER'S IP (bytes 2-3) | | TARGET'S HA (bytes 0-1) | | |
| TARGET'S HA (bytes 2-5) | | | | |
| TARGET'S IP (bytes 0-4) | | | | | where: HARDWARE TYPE is set to 0001 hex to indicate Ethernet

PROTOCOL TYPE is set to 0800 hex to indicate IP addresses

HLEN (hardware address length) is set to 06 hex bytes

PLEN (protocol address length) is set to 04 hex bytes

OPERATION is set to 0001 hex for an ARP Request message 0002 hex for an ARP Response message 0003 hex for a RARP Request message 0004 hex for a RARP Response message SENDER'S HA contains the sender's 48 bit Ethernet hardware address.

SENDER'S IP contains the sender's 32 bit IP address

TARGET'S HA contains the target's 48 bit Ethernet hardware address

TARGET'S IP contains the target's 32 bit IP address

When a host broadcasts a request message, it fills in all of the data and the target's hardware address field is set to 000000 hex if an ARP, or the sender's and target's IP address fields are set to 0000 hex if a RARP. When the target machine responds, it fills in the missing address and changes the operation field to indicate a response message. During an ARP, the target machine swaps the sender's and target's addresses so that the sender's address fields contains its addresses and the target's address fields contains the original requesting host's addresses. During a RARP, the server stores its addresses in the sender's address fields and returns the response to the original sender's hardware address.

When a SNIU Receives a Message, it Performs the Following Processes:

ARP Request: If an ARP Request message is received on a SNIU's port A, the untrusted software in port A's memory segment determines if the sender's IP address is in port A's ARP cache. If not, it creates a new entry in the ARP cache and inserts the sender's hardware and IP addresses. Otherwise, the sender's hardware address is copied into the entry (overwriting any previous address); and packets (if any) waiting to be sent to the sender's IP address are transmitted. If the target's IP address is in port A's address list (i.e., a list of IP addresses which are reachable from port B), the untrusted software returns an ARP Response message swapping the SENDER'S and TARGET'S addresses and inserting port A's Ethernet hardware address into the SENDER'S HA field. In either case, the untrusted software passes the ARP Request to the Trusted Computing Base (TCB).

The TCB checks port B's address list for the SENDER'S IP. If the SENDER'S IP is not in port B's address list, the TCB determines whether the SENDER'S IP is releasable to port B;

and if releasable, inserts it into port B's address list. Secondly, the TCB determines whether a proxy ARP Request should be broadcast from port B. If an ARP Response message was not returned by port A, and the target's IP address is not in port A's ARP cache, and the sender's IP is releasable to port B. The TCB creates a proxy ARP Request Message The TCB inserts port B's hardware and IP addresses in the SENDER'S address fields, copies the target's IP address from the original ARP Request into the TARGET'S IP field, and signals port B's untrusted software to broadcast the message. Each time the TCB releases a proxy ARP Request, it creates an Anticipated Message in the form of a proxy ARP Response message which contains the original sender's addresses in the TARGET'S fields, the target's IP address in the SENDER'S IP field, and port A's hardware address in the SENDER'S HA field. This message is saved in the Anticipated Message list for port A and will be released to port A's untrusted software for transmission if the anticipated ARP Response message is received on port B. Note that releasability may involve the TCB modulating ARP Requests from a high network to a low network in order to not exceed the 100 bits per second covert channel bandwidth requirement.

ARP Response: If an ARP Response message is received on a SNIU's port A, the untrusted software in port A's memory segment determines if the sender's IP address is in port A's ARP cache. If not, it creates a new entry in the ARP cache and inserts the sender's hardware and IP addresses. Otherwise, the sender's hardware address is copied into the entry (overwriting any previous address); and packets (if any) waiting to be sent to the sender's IP address are transmitted. Finally, the untrusted software passes the ARP Response to the TCB.

The TCB checks port B's address list for the SENDER'S IP. If the SENDER'S IP is not in port B's address list, the TCB determines whether the SENDER'S IP is releasable to port B; and if releasable, inserts it into port B's address list. Secondly, the TCB checks the Anticipated Message list for port( B and determines whether the ARP Response was due to a proxy ARP Request made for a request originally received on port B. If the SENDER'S IP matches an entry in the Anticipated Message list and the message is releasable to port B. The TCB signals port B's untrusted software to create a proxy ARP Response message identical to the Anticipated Message, and removes the message from the Anticipated Message list for port B.

RARP Request: If a RARP Request message is received on a SNIU's port A, the untrusted software in port A's memory segment checks a flag to determine if the SNIU was initialized to act as a RARP server for the network attached to port A. If not, the received message is ignored. Otherwise, the untrusted software passes the RARP Request to the TCB.

The TCB determines whether the RARP Request can be released to port B. If releasable, it creates a proxy RARP Request message copying the TARGET'S HA from the received message and inserting port B's addresses in the SENDER'S HA and IP fields, passes the proxy RARP Request message to port B's untrusted software for broadcast, and creates an Anticipated message in the form of a proxy RARP Response message. The TCB copies the original TARGET'S HA, inserts port A's hardware address in the SENDER'S HA, and saves it in the Anticipated Message list for port A.

RARP Response: If a RARP Response message is received on a SNIU's port A, the untrusted software in port A's memory segment determines if the sender's IP address is in port A's ARP cache. If not, it creates a new entry in the ARP cache and inserts the sender's hardware and IP addresses. Otherwise, the sender's hardware address is copied into the entry (overwriting any previous address); and packets (if any) waiting to be sent to the sender's IP address are transmitted. Finally, the untrusted software inserts the TARGETS IP into port A's address list and passes the RARP Response to the TCB.

The TCB checks port B's address list for the SENDER'S IP. If the SENDER'S IP is not in port B's address list, the TCB determines whether the SENDER'S IP is releasable to port B; and if releasable, inserts it into port B's address list. Secondly, the TCB determines whether the TARGET'S IP is releasable to port B. If releasable, the TCB creates a new entry in port B's ARP cache and inserts the TARGET'S HA and IP. The TCB uses the. TARGETS HA to find the appropriate proxy RARP Response message in port B's Anticipated Message List and copies the TARGET'S IP and SENDER'S IP into the Anticipated message signals port B's untrusted software to create a proxy RARP Response message identical to the Anticipated Message and removes the message from the Anticipated Message list for port B.

Trusted Session Protocol

Dragonfly units (e.g., SNIUs and Companions) establish associations in order to authenticate each other, exchange security parameters, and establish a trusted session for communication Dragonfly uses a combination of custom messages and standard ICMP Echo Request and Echo Reply messages to identify Dragonfly units between source and destination hosts on a network and establish a trusted communications path. Once the path and an association between two SNIUs has been established, user datagrams are encapsulated in custom Dragonfly messages called Protected User Datagrams for secure transmission between the two SNIUs. This collection of messages to establish and utilize associations is—referred to as the Dragonfly Trusted Session Protocol (TSP).

When a host behind a SNIU attempts to communicate with someone else over the network, the SNIU stores the datagram from the host in a Waiting Queue and transmits an Association Request Message and an ICMP Echo Request to the intended destination. The Association Request Message is used to identify other Dragonfly units in the communications path and to carry the originating SNIU's security parameters. The SNIU inserts the originating host's security level, appends its certificate, and signs the message. The ICMP Echo Request message contains a flag which indicates that it came from a SNIU. This message is referred to as a Dragonfly Ping Message.

Each Dragonfly unit which receives the Association Request Message authenticates the message, saves a copy of the message, appends its certificate, signs the message, sends it on to the destination, and sends a new Dragonfly Ping Message to the destination. When a SNIU receives a Dragonfly Ping Message from another SNIU, the message is discarded and not passed through to the destination. When a destination host receives an Association Request Message, it does not recognize the Dragonfly custom protocol; so it discards the message. However, the destination host does recognize the Dragonfly Ping Message as an ICMP Echo Request message; so it returns an ICMP Echo Reply message. Therefore, a SNIU only receives an ICMP Echo Reply if and only if no other SNIU exists between the SNIU which sent the Dragonfly Ping Message (an ICMP Echo Request) and the destination host.

The SNIU which receives the ICMP Echo Reply message is the terminating SNIU (i.e., closest to the destination) in the potential association's communications path. This SNIU determines if the association should be permitted (i.e., would not violate the security policy). If permitted, the SNIU grants the association, generates an encryption key for the association, and encrypts the key using the originating SNIU's public key (from its certificate). If the saved copy of the Association Request Message contained an intermediate SNIU's certificate, the SNIU also generates a release key and encrypts it using the intermediate SNIU's public key. The terminating SNIU creates an Association Grant Message, stores the encrypted key(s), inserts the destination host's security level, appends its certificate, signs the message, and sends it onto the originating SNIU. Each intermediate SNIU (if any exist) which receives the Association Grant Message authenticates the previous SNIU's signature, extracts the release key, generates a new release key for the next SNIU, encrypts the key using the public key (from the certificate in the saved copy of the Association Request message) of the next SNIU, removes the previous intermediate SNIU's certificate and signature, appends its own certificate and signature, and sends the message on the return path. When the originating SNIU receives the Association Grant Message it authenticates the message and extracts the key(s).

Once association is granted, the originating SNIU fetches the originating host's datagram from the Waiting Queue and prepares to send it to the terminating SNIU in the newly established association. The SNIU uses the association key to encrypt the datagram for privacy and store it and the encryption residue into a new datagram from the originating SNIU to the terminating SNIU. If the association contains intermediate SNIUs, the originating SNIU uses the release key to calculate a second encryption residue and appends it to the datagram. Finally, the SNIU transmits the protected user datagram to the peer SNIU in the association.

When the protected user datagram is received by an intermediate SNIU (if any in the path), the intermediate SNIU fetches the release key corresponding to the previous SNIU and uses the release key to validate the datagram. If valid, the SNIU removes the release key residue from the datagram and checks to determine whether there are more intermediate SNIUs in the path before reaching the terminating SNIU. If another intermediate SNIU exists, the release key corresponding to the next intermediate SNIU is used to calculate a new release residue which is appended to the datagram. In either case, the datagram is sent on its way out the opposite the opposite port from which it was received.

When the terminating SNIU receives the protected user datagram, it uses the association key corresponding to the originating SNIU to decrypt and validate the datagram. If the source and destination hosts are at the same security level (i.e., a write-equal situation), the decrypted datagram is sent out the opposite port to the destination host. If the source host has a lower security level than the destination (i.e., a write-up situation), the SNIU predicts the response from the destination and saves it before sending the decrypted datagram to the destination host. If the source host has a higher security level than the destination (i.e., a write-down situation), the received datagram (i.e., a response to a previous datagram from the lower level host) was predicted by the SNIU which sent the protected datagram. Therefore, this SNIU is assured that the classification of the received datagram is dominated by the lower level destination host; so the datagram is released to the destination. If a SNIU receives a user datagram from a native host which would be a write-down to the destination host and no predicted datagram is found, the received datagram is erased and the attempted write down is audited.

Message Processing Tables

There are three tables which are used to process in-coming and out-going messages; the Association Table, the Symmetric Key Table (Sym_Key), and the Certificate Table. Each SNIU has two Association tables one for each port Each entry contains data corresponding to a particular source or destination address. The Sym_Key table contains data corresponding to a particular message encryption key (MEK) which could be used as a release key or an association key. The Certificate table contains recently received certificates from other SNIUs.

Each table consists of a linked list of tokens in which the data for an entry in the table is stored in a token. The tokens for each table have a unique data structure and are linked together in 'free' lists during initialization. When a new entry is made in one of the tables, a token is removed from the free list for that table's tokens, the data for the new entry is inserted in the appropriate fields of the token, and the token is linked at the top of the table. When an entry is removed from a table, the 'previous' and 'next' tokens are linked, the data fields in the token are cleared, and the token is linked at the bottom of the appropriate free list. Whenever the data in an entry is used, the token is removed from the table and relinked at the top of the table. In this way, the oldest (i.e., least used) entry is at the bottom of the able. If a new entry is needed and the free list is empty, the bottom token is removed from the table, the data fields are cleared, the new entry's data is inserted, and the token is linked at the top of the table. In addition, when a SNIU removes the bottom (oldest unused) token in the Sym_Key Table, it also removes every token in the Association Table which pointed to the removed key. A SNIU does not terminate an association when a certificate, key, or Association Table entry is removed because many valid entries using the same association could still exist.

A token for the Association Table has the following data structure:

| 0 | 8 | 16 | 24 | 31 |
|---|---|---|---|---|
| NEXT ||||||
| PREVIOUS |||||
| IP ADDRESS |||||
| PEER SNIU IP ADDRESS |||||
| ASSOCIATION KEY POINTER |||||
| RELEASE KEY POINTER |||||
| ASSOC-TYPE | RELKEY-TYPE | SECURITY-LEVEL | | AC-CLIENT | where: NEXT is a pointer to the next token in the table or list

PREVIOUS is a pointer to the previous token in the table or list

IP ADDRESS is the IP address of the source/destination

PEER SNIU IP ADDRESS is the address of the other terminating SNIU for the association ASSOCIATION KEY POINTER points to the association MEK in the Sym_Key table RELEASE KEY POINTER points to the release MEK in the Sym_Key table ASSOC-TYPE is set to 0001 hex for "pending"
0002 hex for "host"
(i.e., the entry is for a host destination)
0003 hex for "sniu"
(i.e., the entry is for a SNIU destination)
0004 hex for "native host" (i.e., no peer SNIU)
0005 hex for "audit catcher"

RELKEY-TYPE is set to 0001 hex for "in" (i.e.,
  use to validate release key residue)
  0002 hex for "out"
  (i.e., use to add release key residue)
  0003 hex for "both"
SECURITY-LEVEL indicates the security level—of the source/destination
AC-CLIENT indicates if the source/destination is an audit catcher client
A token for the Sym_Key Table has the following data structure:

| 0 | 8 | 16 | 24 | 31 |
|---|---|---|---|---|
| | | NEXT | | |
| | | PREVIOUS | | |
| | DISTINGUISHED NAME (bytes 0-3) | | | |
| | — | | | |
| | DISTINGUISHED NAME (bytes 28-31) | | | |
| | MEK (bytes 0-3) | | | |
| | MEK (bytes 4-7) | | | |
| | MEK (bytes 8-11) | | | |
| | IV (bytes 0-3) | | | |
| | IV (bytes 4-7) | | | |
| | IV (bytes 8-11) | | | |
| | IV (bytes 12-15) | | | |
| | IV (bytes 16-19) | | | |
| | IV (bytes 20-23) | | | |
| | CERTIFICATE POINTER | | | |
| INDEX | SPARE | | SPARE | | where: NEXT is a pointer to the next token in the table or list

PREVIOUS is a pointer to the previous token in the table of list

DISTINGUISHED NAME is the 128 byte name in certificate from the other SNIU using this key MEK is the 12 byte wrapped key (association or release) shared with the another SNIU IV is the 24 byte initialization vector associated with the MEK CERTIFICATE POINTER points to the other SNIU's certificate in the Certificate table INDEX is a Fortezza card key register index which indicates if and where the key is loaded (1-9 are valid key register indexes, 0 indicates that the key is not loaded on the Fortezza)

SPARE is an unused byte to keep addressing on 32-bit boundary

Dragonfly Message Flag

Any message (IP datagram) which is generated or modified by a Dragonfly unit contains a Dragonfly Message Flag in the last four bytes of the datagram. The first byte is the message type field; the second byte is the message format field; and the third and fourth bytes are the Dragonfly Flag. Note that all Dragonfly message types are signed except for Dragonfly Ping and Protected User Datagram (PUD) Messages. Note that a PUD uses MEK residues for integrity and authentication.

| | |
|---|---|
| Message Type: | 51. Audit Event |
| | 52. Audit Catcher List |
| | 53. Audit Catcher Check-In |
| | 54. Audit Mask |
| | 55. Host Unknown |
| | 56. Association Request |
| | 57. Association Grant |
| | 58. Association Denial (currently not implemented) |
| | 59. Association Unknown |
| | 60. Protected User Datagram |
| | 61. Receipt |
| | 62. Certificate Revocation List |
| | 63. Dragonfly Ping |
| | 64. SNIU Initialization |
| | 65. Association Established |
| | 66. Release Key Unknown |
| Message Format: | 46. Signed Type 1 (source SNIU's certificate and signature) |
| | 47. Signed Type 2 (source and intermediate SNIU's certificates and signature) |
| | 48. PUD Type 1 (Association MEK residue) |
| | PUD Type 2 (Association MEK and Release MEK residues) |
| Dragonfly Flag: | dfdf hex |

Waiting Queue and Schedule Table

The Waiting Queue is used to store IP datagrams for potential future processing based upon some anticipated vent. For every entry made in the Waiting Queue, a corresponding entry is made in the Schedule Table. The Schedule Table is used to automatically process entries in the Waiting Queue if they have not been processed within some pre-determined amount of time (i.e., the anticipated event does not occur). The Schedule Table entry contains a time-out field (which is set to the current time plus some reasonable delta representing the maximum waiting period) and a function pointer (which indicates which subroutine should be called if time expires before the Waiting Queue entry is processed). The Schedule Table is checked in the main executive loop of the TCB; expired entries are removed; and the corresponding datagrams in the Waiting Queue are processed by the designated subroutine.

For example, when a SNIU receives a user datagram from a native host which is destined for another host for which there is no existing association, the SNIU stores the user datagram in the Waiting Queue and transmits an Association Request Message. When the Association Grant Message is received, the user datagram is removed from the Waiting Queue, the corresponding Schedule Table entry is deleted, and the user datagram is encrypted and sent to the peer SNIU of the association. If an Association Grant Message is never received, the Schedule Table entry expires which calls a subroutine to delete the user datagram from the Waiting Queue.

Another example is when SNIU sends an Audit Event Message to an Audit Catcher. The transmitted datagram is stored in the Waiting Queue. When the Receipt Message is received from the Audit Catcher, the original Audit Event datagram is removed from the Waiting Queue and the corresponding Schedule Table entry is deleted. If the Schedule Table entry expires, the designated subroutine is called which re-transmits the Audit Event Message stored in the Waiting Queue and a new entry is made in the Schedule Table.

Generating and Exchanging MEKs

Message Encryption Keys (MEKs) are generated during the association establishment process (previously described) and are exchanged via the Association Grant Message. When a SNIU generates an MEK it simultaneously generates an initialization vector (IV).

When a SNIU exchanges an MEK with another SNIU, it generates a random number, RA, which is required to encrypt (i.e., wrap) the MEK. The key exchange algorithm is designed so that only the sending and receiving SNIUs can decrypt the MEK and use it. The sender wraps the MEK for transmission using the destination's public key, RA, RB (which is always set=1), and the sender's private key. IVs which were generated with release keys are transmitted in the clear with the wrapped MEK in the Association Grant Message. IVs which were generated with association keys are ignored. The recipient unwraps the key using its private key, RA, RB, and the sending SNIU's public key. Once unwrapped, the safe exchange is complete.

Each SNIU re-wraps the MEK using its storage key (Ks), stores the MEK and the IV (if the MEK is a release key) in the Sym_Key Table, stores the pointer to the MEK in the Association Table and stores the Distinguished Name (of the other SNIU sharing this MEK) in the Sym_Key Key Table entry.

Using MEKs and IVs

Message Encryption Keys (MEKs) are used as association and release keys to provide confidentiality, integrity and authentication of user datagrams during an association between two SNIUs. IVs are used to initialize the feedback loop in the Skipjack encryption algorithm for most modes of operation. Encrypting identical data using the same MEK, but different IVs, will produce different ciphertext. In fact, the Fortezza card requires the user to generate a new IV for each encryption event in order to assure that each message looks different when encrypted.

When a SNIU encrypts a user datagram it first generates a new IV for the association key, encrypts the datagram, appends the encryption residue for integrity and authentication purposes, and appends the new IV. If the association involves intermediate SNIUs, the SNIU does a second encryption operation (on the new ciphertext, residue, and IV) using the release key and release key IV. The release key IV is never changed since the encrypted data is always guaranteed to be unique even if the original datagram was not. The release key residue is appended to the protected user datagram. The completed protected user datagram is transmitted.

Received Message Processing

When a SNIU receives an IP datagram it checks the destination address in the header and determines if it is the intended recipient. Then, it checks the last four bytes of the IP datagram for the Dragonfly Message Flag and determines the type and format of the received message.

Destination SNIU Message Processing

When a SNIU receives an IP datagram which is addressed to it, the message should be one of the following types of Dragonfly formatted messages. If it is not, the SNIU will audit the event. The only exceptions are ICMP Echo Request messages which are processed by the receiving port's untrusted software and not passed to the trusted computing base.

51. Audit Event: If the SNIU is not configured to be an Audit catcher, it will audit the event sending the source IP address of the, received message to its primary Audit Catcher. If the SNIU is configured to be an Audit Catcher, it verifies the signature on the message, increments its received audit event sequence number, generates a time-stamp, and prints the sequence number, time-stamp, source IP address, and ASCII character string from the message. Once the event has been recorded, the Audit Catcher SNIU generates a Receipt Message (copies the audit event counter from the received message and inserts it in the message number field) and sends it.

52. Audit Catcher List: The SNIU verifies the signature on the message, stores the new list of Audit Catchers in the Configuration Table, generates a SNIU Initialization Message, generates a Receipt Message, and updates the Audit Catcher Check-In Message stored in the Waiting Queue.

53. Audit Catcher Check-In: If the SNIU is not configured to be an Audit Catcher, it will audit the event sending the source IP address of the received message to its primary Audit Catcher. If the SNIU is configured to be an Audit Catcher, it verifies the signature on the message, generates a time-stamp, prints the time-stamp and source IP address, and compares the audit mask in the received message with the current mask. If they do not match, the current audit mask is sent to the SNIU which just checked-in. Note that the period between check-ins is a parameter in each SNIU's configuration data. The audit catcher does not return a Receipt Message in any case.

54. Audit Mask: The SNIU verifies the signature on the message, stores the new audit mask in the Configuration Table and the Audit Catcher Check-In Message stored in the Waiting Queue, generates a Receipt Message, and audits the event (in case someone else other than the Audit Catcher is distributing new audit masks).

55. Host Unknown: When a SNIU receives a valid Protected User Datagram, but cannot find the destination's Association Table entry, it sends a Host Unknown Message back to the originating SNIU and audits the event. The originating SNIU verifies the signature on the received Host Unknown Message, extracts the original destination host's IP, removes the host's entry from its Association Table and audits the event it does not remove the peer SNIU's entry nor entries from the Sym_Key Key Table as they might be supporting other associations.

56. Association Request: This message should only be sent to native hosts and intercepted by SNIUs; but a SNIU should never be the destination.

57. Association Grant: The SNIU verifies the signature in the datagram and updates the receiving port's Association Table entries for the peer SNIU and host destination. The SNIU determines if an entry exists for the peer SNIU. If not the SNIU creates a new entry for the peer SNIU and marks the association type as 'sniu'. In either case, the SNIU extracts and unwraps the association MEK (and release MEK if needed), stores the re-wrapped key(s) in the Sym_Key Table (being careful to over-write the old keys without changing the pointers to the keys if some already existed), and marks the release key type as 'out' (if a release key exists).

If the received message indicates that existing release keys are to be used, the SNIU searches the Association Table for 'sniu' type entries and checks the DN of each Sym_Key Key Table entry identified via the release key pointer. The SNIU compares that DN with the DN in the bottom certificate in the received message. If a match is found, the release key pointer is copied to the Association Table entry for the peer SNIU of this new association. If no match can be found, the SNIU generates a Release Key Unknown Message. This message is generated by modifying the received Association Grant Message. The destination address (its IP) is swapped with the peer SNIU's address (i.e., the association granting SNIU's IP in the data section of the datagram. The previous SNIU's certificate is replaced with this SNIU's certificate so the previous SNIU can wrap the new release key and return to this SNIU in the Association Grant Message. The signature at the bottom is removed. The Message number is changed from 58 to 66. The new message is signed and sent back to the previous SNIU in the path. Finally, the association type field of the peer SNIU's entry in the Association Table is changed back to 'pending'. If a Release Key Unknown Message is transmitted, the SNIU waits for the new release key in another Association Grant message before continuing.

If the peer SNIU's Association Table entry is complete, the SNIU finds the entry for the destination host, changes the association type from 'pending' to 'host', inserts the peer SNIU's IP copies the association and release key pointers and release key type from the peer SNIU's entry, and copies the destination host=s security level from the received message.

Once the receiving port's Association Table has been updated, the SNIU finds the original host's user datagram in the Waiting Queue, removes the corresponding entry from the Schedule Table, and compares the source and destination security levels to determine it user datagram can be sent to the destination. If the source's security level is dominated by (i.e., less than or equal to) the destination's security level, the SNIU creates a Protected User Datagram (PUD). The SNIU sets the destination to the peer SNIU's IP, sets the protocol type to indicate a Dragonfly Message, uses the association key to encrypt the entire received datagram and prefixed source host's security level, inserts the ciphertext and IV, appends the association residue, generates and inserts a release residue (if the destination host's Association Table entry contains a pointer to a release key), appends the appropriate Dragonfly Message Flag, and sends the datagram. If the source host is not dominated by the destination (i.e., a potential write-down), the attempted write-down is audited. This procedure is repeated for each entry in the Waiting Queue which is intended for the same destination.

58. Association Denial: (currently not implemented)

59. Association Unknown: A SNIU sends an Association Unknown Message (and generates audit notices) when a Protected User Datagram or Association Exists message is received and a corresponding Association Table entry does not exist. The message is sent back to the source SNIU and contains the destination SNIU's IP address. When a SNIU receives an Association Unknown Message, it deletes every entry in the Association Table in which the peer SNIU's IP matches the returned destination SNIU IP. Subsequent user datagrams from the same host sent to the same destination will initiate an Association Request to re-establish the association.

60. Protected User Datagram (PUD): The SNIU uses the source IP to find the peer SNIU's entry in the receiving port's Association Table and retrieve the association key to decrypt and validate the received datagram. If the decryption residue does not match, the event is audited. Otherwise, the SNIU uses the destination host's IP to find the appropriate entry in the opposite port's Association Table, retrieves the destination host's security level, and compares it to the security level in the received datagram. If a write-up situation, the SNIU generates an anticipated message. However, regardless of the relative security levels, the decrypted and validated user datagram is sent to the destination host.

If the decrypted and validated datagram is a broadcast message, the SNIU compares the security level of the received datagram and the security level of the opposite port. If the security level of the opposite port dominates that of the datagram, the SNIU releases the datagram Out the opposite port.

If a terminating SNIU receives a PUD and cannot find the peer SNIU's entry in the Association Table, the SNIU returns an Association Unknown Message (containing this SNIU's IP) and audits the event. If the receiving SNIU validates the residue but cannot deliver the user datagram because it cannot fund the destination host in the Association Table, then the SNIU returns a Host Unknown Message (containing the destination host's IP) to the originating SNIU and audits the event.

61. Receipt: A Receipt Message is sent by an Audit Catcher to a SNIU for a SNIU Initialization or an Audit Event message. The SNIU uses the message number in the received datagram to locate the saved copy of the original message in the Waiting Queue and remove it and the corresponding Schedule Table entry. If the original message was a SNIU initialization Message, the SNIU locates the Association Table entry for the Audit Catcher and changes the association type from 'pending' to 'audit catcher'. If time expires in the Schedule Table entry before the Receipt Message is received the SNIU will retransmit the original Message. If no receipt is received after TBD attempts, the SNIU will switch to the next Audit Catcher in its list. If all Audit Catchers are attempted without success, the SNIU will check a configuration parameter to determine whether to continue without audit or halt.

SNIUs issue Receipt Messages to the source for Audit Catcher List, Audit Mask, and Certificate Revocation List messages. When the source receives a receipt, it uses the returned message number to remove the copy of the message from the Waiting Queue and the corresponding Schedule Table entry. Refer to the section above. "Waiting Queue and Schedule Table", for more details.

62. Certificate Revocation List: If a Certificate Revocation List (CRL) is received the SNIU returns a receipt to the source and checks the Sym_Key Table far any keys which were received from (or sent to) another SNIU with a revoked certificate. For each entry which contains the Distinguished Name (DN) of a revoked certificate the SNIU deletes the certificate from the Certificate Table (if it is still there), deletes the Sym_Key Key Table entry, and deletes every entry in the Association Table which pointed to the key. Note that deleting a table entry means to unlink the token from the table, clear the token's memory, and re-link the token in the token's free list.

63. Dragonfly Ping: This message can only be received by a SNIU which is the terminating SNIU in an association (i.e., the closest SNIU to the destination host). This SNIU originally transmitted a Dragonfly Ping Message (in the form of an ICMP Echo Request) along with an Association Request Message to some unknown destination which converted the Echo Request to an Echo Reply, returned it, and ignored the Association Request Message (which could only be processed by another SNIU).

Upon receiving this message the SNIU checks the originating SNIU IP in the data section of the received message to determine if it is the only SNIU in the association (i.e., the only SNIU between the originating host and the destination host). If it was the originator, the SNIU uses the source IP address to find the destination's entry in the Association Table, changes the association type from 'pending' to 'native host', sets the security level to that port's security level, finds the original host's user datagram in the Waiting Queue, removes the corresponding entry from the Schedule Table, and compares the source and destination security levels to determine if the user datagram can be sent to the destination. If the comparison indicates a write-up situation, the SNIU generates and saves an anticipated message and releases the original datagram to the destination port. If a write-down situation, the SNIU deletes the datagram and audits the attempted write-down. If a write-equal, the datagram is released to the destination port. This procedure is repeated for each entry in the Waiting Queue which is intended for the same destination.

If this SNIU was not also the originating SNIU, the originating SNIU's and originating host's IP addresses in the data section of the received Echo Reply are used to identify the peer SNIU's entry in the Association Table and fetch the Association Request Message which was saved in the Waiting Queue (and delete the corresponding entry from the Schedule Table). Then the SNIU creates or updates three Association Table entries. First, it creates an entry (if it doesn't already exist) in the receiving port's Association Table for the original destination host (using the source IP from the received datagram header), marks the association type as 'native host' and stores the receiving port's security level in the security level field.

Second, it updates the entry in the opposite port's Association Table for the peer SNIU. If the peer SNIU's entry is already complete (i.e., the association type field is marked as 'sniu'), the SNIU verifies that the DN in the Sym_Key Table entry for the association key is still valid and returns an Association Exists Message (containing the original destination host's IP and security level) instead of an Association Grant Message to the peer SNIU. If the DN or the certificate has changed, the SNIU deletes all entries in the Association Table which refer to this entry as the peer SNIU and then continues as if this was the first association with this peer SNIU and over-writes the old data. If the peer SNIU entry in the Association Table is incomplete (i.e., the association type field is marked as 'pending'), the SNIU continues to fill in the missing data as follows. If the release key type is marked 'out' or 'both', then the association path contains at least one intermediate SNIU; therefore, the SNIU must extract the peer SNIU's certificate from the Association Request Message and store it in the Certificate Table. If a certificate with this DN already exists, but is not identical, then the SNIU must locate and delete all other Sym_Key Key Table and Association Table entries referencing this certificate.

In either case, the SNIU stores the pointer to the certificate the DN in a Sym_Key Table entry, and stores the pointer to the Sym_Key Key Table entry in the association key pointer field of the Association Table entry. If there aren't any intermediate SNIUs, the pointer in the release key pointer field is copied to the association key pointer field; and the release key pointer field is cleared. In either case, the association type is changed from 'pending' to 'sniu'. The SNIU generates the association key and stores the key in the Sym_Key Key Table entry. If a release key is needed for an intermediate SNIU, the SNIU must determine if a release key associated with the intermediate SNIU's certificate's DN already exists. The SNIU uses the release key pointer in each entry with association type 'sniu' in the Association Table to locate the Sym_Key Key Table entry of every release key. If a match is found the pointer to that Sym_Key Key Table entry is copied. Otherwise, a new release key is generated and stored.

The third Association Table entry is for the originating host. It's IP and security level are in the data portion of the Association Request Message. The security level is copied to the entry, the association type is marked as 'host', and the rest of the data is copied from the peer SNIU entry.

Once the Association Table entries are updated, an Association Grant Message is generated. The SNIU stores the source address from the Association Request Message (i.e., the association originating SNIU's IP) in the destination address and stores the destination host's IP in the source address (a little IP spoofing). The SNIU fills in the data section by storing its IP, the destination host's security level, the association key data (wrapped key and RA), and if necessary, the release key data (the wrapped key, RA and IV). If a release key for the first intermediate SNIU on the return path existed previously to establishing this association, the SNIU sets a flag (instead of storing the release key in the message) to instruct the intermediate SNIU to use the existing release key. The Dragonfly Message Flag is inserted at the bottom marking the type as Association Grant and the format as Signed Type I to indicate only one certificate. The message is signed and sent; and the event is audited.

64. SNIU Initialization: This message is sent by a SNIU to it's primary Audit Catcher during the SNIU's initialization to determine whether the Audit Catcher is ready to support the SNIU. Depending upon a configuration parameter, the SNIU may not allow any other message processing until a Receipt Message is received from the Audit Catcher. Upon receiving this message, the Audit Catcher verifies the signature on the message, makes an entry in its receiving port's Association Table using the source IP, marks the association type as 'sniu', returns a Receipt Message, and compares the audit mask in the received message with the current mask. If they do not match, the current audit mask is sent to the SNIU in an Audit Mask Message.

65. Association Exists: If a SNIU receives an Association Request Message, determines that it is the terminating SNIU, and that it already has an existing association with the requesting SNIU; the terminating SNIU will return an Association Exists-Message, instead of an Association Grant Message.

When a SNIU receives an Association Exists Message, it verifies the signature on the message and checks the receiving port B Association Table for an entry for the source SNIU. If the source (i.e., peer) SNIU entry exists, this SNIU uses the destination host's IP address in the message to update (or create, if necessary) the destination host's Association Table entry. It changes the association type from 'pending' to 'host', copies the MEK pointers from the peer's SNIU entry, and copies the security level from the received message. Once the Association Table has been updated, the SNIU locates the user datagram (which was stored in the Waiting Queue until the association was established) and processes the datagram for transmittal the same as if a normal Association Grant Message had been received (see description above).

If an entry cannot be found in the Association Table for the source SNIU, then this SNIU will return an Association Unknown Message to the source SNIU. The message will contain this SNIU's IP address to indicate which association needs to be deleted. Then the SNIU will locate the original host's datagram saved to the Waiting Queue, reset its time-out value in the Schedule Table, and schedule a new event (after some TBD seconds delay) to regenerate a new Association Request Message.

66. Release Key Unknown: A SNIU may receive an Association Grant Message with a flag set to indicate that an existing release key should be used. However, if the SNIU cannot locate the release key, it sends a Release Unknown Key Message back to the previous SNIU requesting it to generate a new release key.

This message is generated by modifying the received Association Grant Message. The destination address (the association originating SNIU's IP) is swapped with the terminating SNIU's address (i.e., the association granting SNIU's IP) in the data section of the datagram. The previous SNIU's certificate is replaced with this SNIU's certificate so the previous SNIU can wrap the new release key and return it to this SNIU in the Association Grant Message. The signature at the bottom is removed. The message number is changed from 58 to 66, and the new message is signed and sent back to the previous SNIU in the path.

Note that this message is addressed to the terminating SNIU which generated the original Association Grant Message. However, this message is intended for the previous SNIU in the new a association's path. Therefore, if the first SNIU to receive this message is an intermediate SNIU, it should process the message and not send it on to the terminating SNIU.

If a SNIU receives a Release Key Unknown Message and it is the destination, the SNIU must be the terminating SNIU which granted the association. The SNIU verifies the signature on the message, swaps the destination address (its IP) with the peer SNIU address (the association originating SNIU's IP) in the data section, uses the new destination address to locate the peer SNIU's entry in the receiving port's Association Table, removes the certificate from the message, and compares the DN in the certificate' with the DN in the Sym_Key Table entry indicated via the peer SNIU's release key pointer. If the DN does not match, the SNIU audits the error and over-writes the DN entry with the DN from the certificate. In either case, the SNIU stores the certificate in the Certificate Table (over-writing the old one if a certificate with the same DN already exists), generates a new release key, over-writes the old release key in the Sym_Key Key Table with the new release key (Ks-wrapped), wraps the key using the public key from the received certificate, stores the wrapped release key in the message, changes the message number from 66 back to 58, stores its certificate in the message, signs and sends it.

Broadcast: Various messages (non-Dragonfly) are broadcast to every device on a network. When a broadcast message is received, the SNIU creates a. Protected User Datagram (containing the received broadcast message and the security level of the port on which the message was received) for every peer SNIU to the opposite port's Association Table and sends them.

Non-Destination SNIU Message Processing

When a SNIU receives an IP datagram which is not addressed to it, the message should be one of the following types of Dragonfly formatted messages. If it is not, the SNIU will assume the IP datagram is from a native host.

Audit Event: The SNIU verifies the signature on the Message and releases the message out the opposite port.

52. Audit Catcher List: The SNIU verifies the signature on the message and releases the message out the opposite port.

53. Audit Catcher Check-In: The SNIU verifies the signature on the message and releases the message out the opposite port.

54. Audit Mask: The SNIU verifies the signature on the message and releases the message out the opposite port.

55. Host Unknown: The SNIU verifies the signature on the message and releases the message out the opposite port.

56. Association Request: When a SNIU receives an Association Request, it validates the signature at the bottom of the message and checks the receiving port's Association Table for an entry with the originating SNIU's IP address. If it cannot find an entry, it creates one, marks the association type as 'pending', stores the previous SNIU' certificate in the Certificate Table, updates the Sym_Key Table entry for the Distinguished Name (DN), stores the pointer to the Sym_Key Table entry in the release key pointer field in the Association Table entry, and store a copy of the received message in the Waiting Queue (and makes a corresponding entry in the Schedule Table If a certificate with this DN already exists, but is not identical then the SNIU must locate and delete all other Sym_Key Table and Association Table entries referencing this certificate. If the previous SNIU was an intermediate SNIU (i.e., the Message Format field of the Dragonfly Message Flag is 'Signed Type 2'), this SNIU marks the release key type field as 'out' and removes the previous SNIU's certificate and signature. In either case, this SNIU appends its certificate and signature and sends the message out other port. It does not make any entry in the out-going port's Association Table.

Finally, the SNIU creates and sends a Dragonfly Ping Message (in the form of an ICMP Echo Request) to the destination host. The SNIU stores the originating SNIU and originating host's IP addresses in the datagram and sets the Dragonfly Flag, but does not sign the message.

57. Association Grant: The SNIU validates the signature at the bottom of the received datagram and if not correct deletes the datagram and audits the event. Otherwise, since it is not the destination, the SNIU is an intermediate SNIU somewhere in the path between the two peer SNIUs. The SNIU creates an entry (if one doesn't already exist) in the receiving port's Association Table for the IP of the terminating SNIU which granted the association (in the data section of the Association Grant Message), marks the association type as 'sniu', marks the release key type as 'm' (if the format is 'Signed Type 1') or 'both' (if the format is 'Signed Type 2'), extracts the release key data (i.e., the wrapped MEK, RA and IV), unwraps and stores the release key in the Sym_Key Table, stores the release key IV in the same Sym_Key Table entry, stores the pointer to the release key in the Association Table, stores the certificate in the Certificate Table, and stores the pointer to the certificate and the DN in the Sym_Key Table entry. If a certificate with this DN already exists, but is not identical, then the SNIU must locate and delete all other Sym_Key Table and Association Table entries referencing this certificate.

If the received Message contains a flag indicating that an appropriate release key already exists, the SNIU uses the release key pointer in every other 'sniu' type entry in the Association Table and compares the DNS of the certificates associated with the release keys. If a match is found, the pointer to the matching Sym_Key Table entry is copied to the new Association Table entry. If no match is found, the SNIU generates a release Key Unknown Message. This message is generated by modifying the received Association Grant Message. The destination address (i.e., the association originating SNIU's IP) is swapped with the peer SNIU's address (i.e., the association granting SNIU's IP) in the data section of the datagram. The previous SNIU's certificate is replaced with this SNIU's certificate so the previous SNIU can wrap the new release key and return it to this SNIU in the Association Grant Message. The signature at the bottom is removed. The message number is changed from 58 to 66. The new message is signed and sent back to the previous SNIU in the path. Finally, the association type field of the terminating SNIU's entry in the Association Table is changed back to 'pending'. If a Release Key Unknown Message is transmitted, the SNIU waits for the new release key in another Association Grant Message before continuing.

Next, the SNIU uses the destination IP address in the header of the received Association Grant Message to find the destination's entry in the opposite port's Association Table. If the association type is 'pending', the SNIU determines whether an existing release should be used or if a new one should be generated. The SNIU uses the release key pointer to fetch the saved certificate of the next SNIU and compares its DN with the DN associated with the other release keys identified via the release key pointers in other 'sniu' type entries. If a match is found, the pointer to the release key's entry in the Sym_Key Table is copied to the new Association Table entry. If a match is not found, the SNIU generates new release key data (an MEK, RA, and IV) and stores the wrapped MEK and IV in the Sym_Key Key Table entry. In either case, the SNIU changes the association type to 'sniu'. If the release key type is 'NULL' 'the SNIU changes it to 'in'; otherwise, it is marked as 'both'.

The SNIU uses the original destination host's IP (the source IP in the header of the Association Grant Message) and the original SNIU's IP (i.e., the destination IP in the header of the Association Grant Message) to locate the Association Request Message which was saved in the Waiting Queue and delete it and the corresponding entry in the Schedule Table.

Finally, the SNIU rebuilds the Association Grant Message to send on to the destination. The SNIU copies the received datagram up to and including the association key data and the certificate of the SNIU which originated the Association Grant Message, inserts its certificate and the release key data (or a flag indicating to use an existing release key), and signs and sends the datagram.

58. Association Denial: Currently not implemented.

59. Association Unknown: The SNIU verifies the signature on the message and releases the message out the opposite port.

60. Protected User Datagram: The SNIU uses the source IP address to find the appropriate entry in the receiving port's Association Table, fetches the release key, and verifies the release key residue. If the release residue is not correct the datagram is delete and the event audited. Otherwise, the SNIU uses the destination IP address to find the appropriate entry in the opposite port's Association Table, fetches the release key, generates the new release residue, overwrites the old release residue, and sends the datagram on in to the destination.

61. Receipt: The SNIU verifies the signature on the message and releases the message out the opposite port.

62. Certificate Revocation List: The SNIU verifies the signature on the Message and releases the message out the opposite port.

63. Dragonfly Ping: The SNIU ignores (i.e., deletes) the ICMP Echo Request and does nothing else. It should also receive an Association Request Message which it will process (see description above). Note that if the datagram is a standard ICMP Echo Request (i.e., no Dragonfly Flag), it is treated as any other Native Host Message (see description below).

64. SNIU Initialization: The SNIU verifies the signature on the message and releases the message out the opposite port.

65. Association Exists: When an intermediate SNIU receives this message, it verifies the signature on the message and verifies that it has entries for both the source and destination IP addresses (i.e., the two peer SNIUs of the association) in the appropriate ports' Association Tables. If everything is verified, the message is released out the opposite port. If either peer. SNIU's entry cannot be found in the Association Table, then this SNIU will return an Association Unknown Message to the source SNIU. The Message will contain the destination SNIU's IP address to indicate which association needs to be deleted. In any case, the SNIU uses the association originating SNIU's and the host destination's addresses in the Association Exists Message to locate and delete the Association Request Message which was saved in the Waiting Queue (and the appropriate Schedule Table entry).

66. Release Key Unknown: A SNIU may receive an Association Grant Message with a flag set to indicate that an existing release key should be used. However, if the SNIU cannot locate the release key, it sends a Release Key Unknown Message back to the previous SNIU requesting it to generate a new release key.

This message is generated by modifying the received Association Grant Message. The destination address (the association originating SNIU's IP) is swapped with the terminating SNIU's address (i.e., the association granting SNIU's IP) in the data section of the datagram. The previous SNIU's certificate is replaced with this SNIU's certificate so the previous SNIU can wrap the new release key and return it to this SNIU in the Association Grant Message. The signature at the bottom is removed.

The message is changed from 58 to 66, and the new message is signed and sent back to the previous SNIU in the path. Note that this message is addressed to the terminating SNIU which generated the original Association Grant Message. However, this message is intended for the previous SNIU in the new association's path. Therefore, if the first SNIU to receive the message is an intermediate SNIU, it should process the message and not send it on to the terminating SNIU.

If a SNIU receives a Release Key Unknown Message and it is not the destination, the SNIU must be an intermediate SNIU somewhere in the middle of the association's path. The SNIU verifies the signature on the message, swaps the destination address (the association granting SNIU's IP) with the per SNIU address (the association originating SNIU's IP) in the data section, uses the new destination address to locate the peer SNIU's entry in the receiving port's Association Table, removes the bottom certificate from the message, and compares the DN in the certificate with the DN in the Sym_Key Key Table entry indicated via the peer SNIU's release key pointer. If the DN does not match, the SNIU audits the error and over-writes the DN entry with the DN from the certificate. In either case, the SNIU stores the certificate in the Certificate Table (over-writing the old one if a certificate with the same DN already exists), generates a new release key, over-writes the old release key in the Sym_Key Key Table with the new release key (Ks wrapped), wraps the key using the public key from the received certificate, stores the wrapped release key in the message, changes the message number from 66 back to 58, stores its certificate in the m. message, signs and sends it.

Native Host Message: When a SNIU receives a user datagram from a native host, the SNIU creates an entry (if one doesn't already exist) in the receiving port's Association Table for the source host's IP, marks the association type as 'native host', sets the security level to the receiving port's security level, and checks the opposite port's Association Table for the destination's IP address.

If an entry does not already exist for the destination the SNIU creates a new entry, marks the association type as 'pending', stores the received datagram in the Waiting Queue, makes a corresponding entry in the Schedule Table, creates an Association Request Message and sends it. Next, the SNIU creates and sends a Dragonfly Ping to the destination host. The SNIU stores the originating SNIU and originating host's IP addresses in the datagram and sets the Dragonfly Fly but does not sign the message. If an Association Table entry exists for the destination and the association type is 'pending', the SNIU stores the e received datagram in the e Waiting Queue, linking it to other datagrams for the same destination.

If an Association Table entry exists for the destination and the association type is 'host', the SNIU compares the source host's security level to the destination host's security level. If the source's security level is dominated by (i.e., less than or equal to) the destination's, the SNIU creates a Protected User Datagram (PUD). The SNIU sets the destination to the peer SNIU's IP, sets the protocol type to indicate a Dragonfly Message, uses the association key to encrypt the entire received datagram, inserts the ciphertext and IV, appends the association residue, generates and inserts a release residue (if the Association Table entry contains a pointer to a release key), appends the appropriate Dragonfly Message Flag, and sends the datagram. If the source host is not dominated by the destination (i.e., a potential write-down), the SNIU determines if this datagram was anticipated. If a matching datagram was predicted, the anticipated datagram is transformed into a PUD (as described above) and sent. If an anticipated message is not found the attempted write-down is audited.

If an Association Table entry exists for the destination and the association type is any other bona fide type (i.e., 'native host', 'sniu' or 'audit catcher', the SNIU compares the source and destination ports' security levels to determine if the datagram can be allowed to proceed. If the comparison indicates a write-up situation, the SNIU generates and saves an anticipated message and releases the original datagram to the destination port. If a write-down situation, the SNIU determines if the datagram was predicted and sends the anticipated message or audits as previously described. If a write-equal, the datagram is released to the destination port.

Exemplary Messaging Using Guard SNIUs

The following example is intended to provide a further illustration of a preferred embodiment of a sequence of operations according to the present invention. This sequence of operations is applicable to communications from a first user utilizing a SNIU to a second user, also utilizing a SNIU, sent over an unsecured network.

The first user transmits an original message intended for the second user utilizing said network. A first Guard SNIU intercepts the original message. The first Guard SNIU then transmits an association request message intended for another SNIU and a ping message intended for the second user.

If the second user receives these messages, and is not utilizing a Companion SNIU, it will ignore the association request message intended for another SNIU and respond to the ping message intended for it. When the first SNIU receives the ping response from the second user, it will determine that it is the "closest" SNIU to the second user, and decide whether transmitting the "original" message to the second SNIU will violate network security parameters. If it will not, then the first SNIU will simply forward the "original" message to the second user. If transmitting the "original" message to the second user will violate security parameters, then the "original" message will not be transmitted to the second user, and this event will be audited.

When a second SNIU receives the association request message intended for another SNIU and the ping message intended for the second user which were transmitted by the first SNIU, it ignores the ping message intended for the second user, and logs the association request message intended for another SNIU. It likewise then transmits another association request message intended for another SNIU and another ping message intended for the second user.

If another SNIU intercepts the second association request message intended for another SNIU and the second ping message intended for the second user, it will perform the same before mentioned steps of the second SNIU. Accordingly, an unlimited number of SNIUs can be interspaced between the first and second SNIUs in the present invention, as each interspaced SNIU will log the association request message received, ignore the ping message received, and further transmit another association request message, and another ping message.

When the second user receives the association request message intended for another SNIU and the retransmitted ping message intended for it, if not utilizing a Companion SNIU, it will again ignore the association request message intended for another SNIU and respond to the ping message intended for it. When a SNIU receives the ping response from the second user, it will determine that it is the "closest" SNIU to the second user. Upon this determination it will now respond to the association request message transmitted from the first SNIU which it logged, with an association grant message. This association grant message includes necessary information for enforcing the network security policy, such as mandatory access control information (i.e. the security level of the second user, and encryption key affiliated with the second SNIU).

Upon receipt of the association grant message transmitted by the second SNIU, the first SNIU can now determine whether allowing the "original" message to be transmitted to the second user will violate any of the network security policies, as the first SNIU now has the security data required to make that decision. If the transmission of the "original" message will not violate the network security policy, then using the encryption key included in the association grant message, the first SNIU will transmit the encrypted "original" message to the second SNIU. Upon receipt thereof, the second SNIU will decrypt the encrypted "original" message and may again determine whether allowing the "original" message to proceed to the second user will violate network security parameters (i.e. discretionary access control). If it will not, the second SNIU can now transmit the "original" message to the second user.

When using the term "closest," in this manner, it is to be understood that "closest" refers to that SNIU which is to be associated or affiliated with the second user.

If the first user is utilizing a Companion SNIU, then that Companion can be seen to perform the steps of the first SNIU in the above example.

If the second user is utilizing a Companion SNIU, then that Companion can be seen to perform the steps of the second SNIU.

It is to be understood that the embodiments described herein are merely exemplary of the principles of the invention, and that a person skilled in the art may make many variations and modifications without departing from the spirit and scope of the invention. All such variations and modifications are intended to be included within the scope of the invention as defined in the appended claims.

What is claimed is:

1. A network access device adapted to provide network security functions, comprising:
 a software stack operative to run on said access device; and
 first network security apparatus for use with said stack, said security apparatus adapted to communicate data with other network security apparatus resident on a computing device over a data network by establishing an association, and where said first network security apparatus is configured to:
  receive a message sent from said other network security apparatus of said computing device over a first physically non-secure network;
  determine whether an association between said network security apparatus and said other network security apparatus of said computing device on said network exists;
  convert at least a portion of said received message to a format utilized by said network; and
  transmit said message received from said other network security apparatus of said computing device to a third network security apparatus over a second physically non-secure network when said association does exist without having to resort to an external entity to secure communications between said other network security apparatus and said third network security apparatus;
 wherein said establishing of said association between said first network security apparatus and said other network security apparatus resident on said computing device results in the execution of a key exchange algorithm in which said network access device and said computing device exchange cryptographic keys over said first physically non-secure network.

2. The device of claim 1, wherein said access device further comprises a network protocol used to resolve an IP address from a given hardware or network address.

3. The device of claim 2, wherein said given hardware or network address comprises an Ethernet address.

4. The device of claim 2, wherein said given hardware or network address comprises a 48-bit address.

5. The device of claim 1, wherein said access device further comprises a network protocol used to resolve a given hardware or network address from an IP address.

6. The device of claim 5, wherein said given hardware or network address comprises an Ethernet address.

7. The device of claim 5, wherein said given hardware or network address comprises a 48-bit address.

8. The device of claim 1, wherein said access device is further adapted to authenticate said third network security apparatus to form an association using a key-exchange algorithm.

9. The device of claim 1, wherein said access device is further adapted to authenticate said third network security apparatus from which said access device has first requested authentication.

10. The device of claim 1, wherein said network security apparatus is disposed substantially within said software stack above the Physical Layer thereof.

11. The device of claim 10, wherein said network security apparatus is disposed substantially within said software stack below the Network Layer thereof.

12. The device of claim 10, wherein said network security apparatus is disposed substantially within said software stack below the Transport Layer thereof.

13. The device of claim 1, wherein said conversion of said at least portion of said received message to said format further comprises encrypting said at least portion using at least one key of a public/private key pair.

14. The device of claim 1, wherein said association comprises a non-permanent trusted communications channel between and unique to said first network security apparatus and said other network security apparatus of said computing device.

15. The device of claim 14, wherein said access device comprises a substantially fixed and stand-alone device.

16. The device of claim 1, wherein said computing device comprises an untrusted operating system.

17. The device of claim 16, wherein said computing device is physically non-secure.

18. The device of claim 1, wherein said association comprises a mutual authentication process, wherein said network security apparatus is adapted to authenticate said other network security apparatus, and further adapted to authenticate itself to said other network security apparatus.

19. The device of claim 1, wherein said first network security apparatus comprises a gateway function, said gateway function permitting secure data communication over a second network.

20. The device of claim 19, wherein said second data network comprises the Internet, and said second data network is in data communication with a website.

21. The device of claim 1, wherein said first network security apparatus of said access device comprises at least one interface port, access to which is based at least in part on identification of a user of said computing device.

22. The device of claim 21, wherein said identification of a user is accomplished based at least in part on a cryptographic element associated with said computing device.

23. The device of claim 1, wherein said network security apparatus is adapted to dynamically generate at least one encryption key for each association, said act of generating not requiring either (i) intervention by a network administrator; or (ii) intervention by a user of said computing device.

24. The device of claim 1, wherein at least one encryption key is dynamically generated by said network security apparatus pursuant to establishing an association with said other network security apparatus, said at least one key being specific to a particular session between said network security device and said other network security device.

25. The device of claim 1, wherein said network security apparatus is adapted to encrypt at least portions of said message using a block cipher.

26. The device of claim 1, wherein said network security apparatus generates at least one encryption key for use in encrypting at least portions of said message, said at least one encryption key comprises at least a portion of a public/private key pair.

27. The device of claim 1, wherein said network security apparatus generates at least one encryption key for use in encrypting at least portions of said message, said at least one encryption key comprises a symmetric encryption key.

28. The device of claim 1, wherein said network security apparatus generates at least one encryption key, and said at least one encryption key provides confidentiality, integrity and authentication of user datagrams during a particular session or association between said network security apparatus and said other network security apparatus.

29. The device of claim 1, wherein said network security apparatus comprises an encryption algorithm that is initialized at least in part using an initialization vector (IV).

30. The device of claim 29, wherein said encryption algorithm is configured so that encrypting data using the same encryption key, but different IVs, will produce different ciphered output.

31. The device of claim 29, wherein said network security apparatus is adapted to generate a new IV for each encryption event.

32. The device of claim 1, wherein said network security apparatus, as part of establishing said association, generates random data that is transmitted to said other network security apparatus.

33. The device of claim 1, wherein said key exchange algorithm is adapted to generate and transmit random data to said other network security apparatus.

34. The device of claim 33, wherein said transmission of said random data is associated with a procedure that permits both said network security apparatus and said other network security apparatus to possess encryption keys that permit the two apparatus to decrypt encrypted data sent by the other.

35. The device of claim 1, wherein at least a portion of said received message is evaluated by said first network security apparatus using a first cryptographic residue generated at said first network security apparatus using at least locally stored information, and a second residue of said received message.

36. The device of claim 35, wherein said evaluation of said first and second residues comprises comparing said residues to see if they match.

37. The device of claim 36, wherein if said first and second residue does not match, a change in the operation of said first network security apparatus is invoked.

38. The device of claim 37, wherein said change in the operation comprises performing a network audit function.

39. The device of claim 1, wherein no pre-positioned network configuration data is used in establishing said association between said first network security apparatus and said other network security apparatus resident on said computing device.

40. The device of claim 1, wherein said association is established at least in part based on an authentication of other network security apparatus resident on said computing device by said first network security apparatus that does not require access to a physically secure storage device.

41. The device of claim 1, wherein said association between said network apparatus and said other network apparatus resident on said computing device is established using only:
 a first message from the other network security apparatus resident on said computing device to the first network security apparatus; and
 a second message from the first network security apparatus to the other network security apparatus.

42. The device of claim 41, wherein said first message comprises a request message, and said second message comprises a grant message.

43. The device of claim 1, wherein said association between said first network apparatus and said other network security apparatus resident on said computing device is established without resort to an entity external to said first network security apparatus or said other network security apparatus.

44. A portal device in communication with one or more devices via a physically unsecure data network and further adapted to provide network security functions, comprising:
 a software stack operative to run on said portal device; and
 network security apparatus for use with said stack, said security apparatus adapted to communicate data between a second network security apparatus resident on a computerized device on said physically unsecure data network and said one or more devices also located on said physically unsecure data network; said network security apparatus operative to:
  establish an ad hoc and temporary association between said portal device and said second network security apparatus of said computerized device by utilizing at least a key exchange algorithm in which said portal device and said second network security apparatus exchange cryptographic keys over said physically non-secure network;
  receive a message sent from said computerized device;
  modify at least a part of said received message to produce a modified message; and
  transmit said modified message to at least one of said one or more devices resident on said physically unsecure data network;
 wherein said network security functions comprise:
  providing confidentiality for at least a portion of said modified message;
  providing integrity protection for at least a portion of said modified message; and
  authenticating said one or more devices as well as authenticating said portal device to said one or more devices.

45. The device of claim 44, wherein said network security apparatus, further comprises:
 an interface for receiving said message sent from said computerized device, wherein said message is intended for transmission over said data network;
 an association determination process configured to determine whether an association exists between the network security apparatus and said second network security apparatus;
 a session management process in communication with said interface and configured to transmit said message to said data network if said association determination process determines that said association exists; and
 an association manager in communication with said interface for establishing an association with said second network security apparatus if said association does not exist.

46. The device of claim 45, further comprising apparatus adapted to, when said association does not exist, buffer or queue said message for at least a period of time prior to releasing said message for transmission over said data network.

47. The device of claim 45, wherein said session manager is adapted to encrypt said message using a block cipher encryption algorithm prior to transmitting said message to said data network.

48. The device of claim 47, wherein said association manager is configured to authenticate a received message from said second network security apparatus during said establishing an association.

49. The device of claim 48, wherein said association comprises an ad hoc trusted communications path between said network security apparatus and said second network security apparatus.

50. The device of claim 45 further comprising an apparatus adapted to generate an encryption key that is substantially unique to said association.

51. The device of claim 44, wherein said network security apparatus operates according to a trusted session-based protocol, said trusted session-based protocol adapted to establishes one or more encryption keys during said establishing an association, said one or more keys being substantially unique to said association.

52. The device of claim 51, wherein said trusted session-based protocol provides at least one mechanism to verify that said message is unaltered during transmission between said computerized device and said security apparatus device.

53. The device of claim 52, wherein said at least one mechanism to verify that said message is unaltered during transmission over said network comprises a cryptographic residue.

54. The device of claim 44, wherein said network security apparatus comprises at least one mechanism to authenticate at least one other computerized device or network security apparatus in communication with said network.

55. The device of claim 54, wherein said at least one mechanism comprises a cryptographic residue.

56. The device of claim 54, wherein said computerized device comprises an untrusted operating system.

57. The device of claim 56, wherein said portal device comprises a gateway, said gateway being in data communication with said network.

58. The device of claim 57, wherein said network comprises the Internet, and said network is in data communication with a website.

59. The device of claim 58, wherein said computerized device comprises a portable computing device.

60. A substantially stand-alone gateway device adapted to provide network security functions and bridging between two physically unsecure networks, comprising:
 a software stack operative to run on said device; and first network security apparatus for use with said stack, said security apparatus adapted to communicate data with other network security apparatus over at least one of first and second physically unsecure data networks in data communication with said gateway device by establishing an association, and where said first network security apparatus is configured to:

receive a message sent from a higher layer process in said device for transmission over at least one of said networks;

determine whether an association between said first network security apparatus and another network security apparatus in communication with said at least one network exists;

convert at least a portion of said received message to a format utilized by said at least one network;

transmit at least portions of said message to said another network security apparatus when said association does exist; and establish an association with said another network security apparatus if said association does not exist by dynamically generating at least one encryption key for each association, said act of generating not requiring intervention by an external entity, said at least one key being specific to a particular session between said first network security apparatus and said another network security apparatus;

wherein said substantially stand-alone gateway provides said network security functions while being directly coupled only to unsecure networks.

61. The device of claim 60, wherein said device further comprises a network protocol used to resolve an IP address from a given hardware or network address.

62. The device of claim 61, wherein said given hardware or network address comprises an Ethernet address.

63. The device of claim 61, wherein said given hardware or network address comprises a 48-bit address.

64. The device of claim 60, wherein said device further comprises a network protocol used to resolve a given hardware or network address from an IP address.

65. The device of claim 64, wherein said given hardware or network address comprises an Ethernet address.

66. The device of claim 64, wherein said given hardware or network address comprises a 48-bit address.

67. The device of claim 60, wherein said first network apparatus is further adapted to authenticate at least one other device or associated network security apparatus requesting to form an association using a key-exchange algorithm.

68. The device of claim 60, wherein said network security apparatus is disposed substantially within said software stack above the Physical Layer thereof.

69. The device of claim 68, wherein said network security apparatus is disposed substantially within said software stack below the Network Layer thereof.

70. The device of claim 68, wherein said network security apparatus is disposed substantially within said software stack below the Transport Layer thereof.

71. The device of claim 60, wherein said conversion of said at least portion of said received message to said format further comprises encrypting said at least portion using at least one key of a public/private key pair.

72. The device of claim 60, wherein said association comprises a non-permanent trusted communications channel between and unique to said first network security apparatus and said other network security apparatus.

73. The device of claim 60, wherein said association comprises a mutual authentication process, wherein said first network security apparatus is adapted to authenticate said other network security apparatus, and further adapted to authenticate itself to said other apparatus.

74. The device of claim 60, wherein said act of generating not requiring intervention by said external entity comprises not requiring either: (i) intervention by a network administrator; or (ii) an administration entity.

75. The device of claim 60, wherein said first network security apparatus is adapted to encrypt at least portions of said message using a block cipher.

76. The device of claim 60, wherein said first network security apparatus generates at least one encryption key for use in encrypting at least portions of said message, said at least one encryption key comprises at least a portion of a public/private key pair.

77. The device of claim 60, wherein said first network security apparatus generates at least one encryption key for use in encrypting at least portions of said message, said at least one encryption key comprises a symmetric encryption key.

78. The device of claim 60, wherein said first network security apparatus generates at least one encryption key, and said at least one encryption key provides confidentiality, integrity and authentication of user datagrams during a particular session or association between said first network security apparatus and said other network security apparatus.

79. The device of claim 60, wherein said first network security apparatus comprises an encryption algorithm that is initialized at least in part using an initialization vector (IV).

80. The device of claim 79, wherein said encryption algorithm is configured so that encrypting data using the same encryption key, but different IVs, will produce different ciphered output.

81. The device of claim 79, wherein said first network security apparatus is adapted to generate a new IV for each encryption event.

82. The device of claim 60, wherein said first network security apparatus, as part of establishing said association, generates random data that is transmitted to said other network security apparatus.

83. The device of claim 60, wherein said first network security apparatus further comprises a cryptographic element exchange algorithm adapted to generate and transmit random data to said other network security apparatus.

84. The device of claim 83, wherein said transmission of said random data is associated with a procedure that permits both said first network security apparatus and said other network security apparatus to possess encryption keys that permit the two apparatus to decrypt encrypted data sent by the other.

85. The device of claim 60, wherein said association is established at least in part based on an authentication of said other network security apparatus by said first network security apparatus that does not require access to a physically secure storage device.

86. A network access device adapted to provide network security functions, comprising:

a software stack operative to run on said access device; and first network security apparatus for use with said stack, said security apparatus adapted to communicate data with other network security apparatus resident on a computing device over a unsecure data network to a third computing device by establishing an association, said association comprising a non-permanent trusted communications channel between and unique to said first network security apparatus and said other network security apparatus of said computing device, and where said first network security apparatus is configured to:
- receive a message sent from said other network security apparatus of said computing device via said unsecure data network;
- determine whether an association between said network security apparatus and said other network security apparatus of said computing device on said network exists;
- execute a mutual authentication process, wherein said network security apparatus is adapted to authenticate said other network security apparatus, and further adapted to authenticate itself to said other network security apparatus
- convert at least a portion of said received message to a format utilized by said network; and
- transmit said message received from said other network security apparatus of said computing device to said third computing device via said unsecure network when said association does exist;

wherein said establishing of said association between said first network security apparatus and said other network security apparatus resident on said computing device results in the execution of a key exchange algorithm adapted to cause said network access device and said computing device to exchange cryptographic keys; and wherein said network security apparatus is adapted to dynamically generate at least one encryption key for each association, said at least one key being specific to a particular session between said network security apparatus and said other network security apparatus, said act of generating not requiring either (i) intervention by a network administrator; or (ii) intervention by an external network entity in order to transmit said message to said third computing device via said unsecure network.

87. A gateway device in communication with one or more devices via a first physically unsecure data network and further adapted to provide network security functions, comprising:
- a software stack operative to run on said gateway device; and
- network security apparatus for use with said stack, said security apparatus adapted to communicate data between a second network security apparatus resident on a computerized device on a second physically unsecure data network and said one or more devices located on said first physically unsecure data network; said network security apparatus operative to:
  - establish an ad hoc and temporary association between said gateway device and said second network security apparatus of said computerized device by utilizing at least a key exchange algorithm in which said gateway device and said second network security apparatus exchange cryptographic keys over said second physically non-secure network;
  - receive a message sent from said computerized device;
  - modify at least a part of said received message to produce a modified message; and
  - transmit said modified message to at least one of said one or more devices resident on said first physically unsecure data network;

wherein said network security functions comprise:
- providing confidentiality for at least a portion of said modified message;
- providing integrity protection for at least a portion of said modified message; and
- authenticating said one or more devices as well as authenticating said gateway device to said one or more devices.

88. The device of claim 87, wherein said network security apparatus, further comprises:
- an interface for receiving said message sent from said computerized device, wherein said message is intended for transmission over said first data network;
- a session management process in communication with said interface and configured to transmit said message to said first data network when a security association exists; and
- an association manager in communication with said interface for establishing an association with said second network security apparatus if said association does not exist.

89. The device of claim 88, further comprising apparatus adapted to, when said association does not exist, buffer or queue said message for at least a period of time prior to releasing said message for transmission over said first data network.

90. The device of claim 87, further comprising a session management process adapted to encrypt said message using a block cipher encryption algorithm prior to transmitting said message.

91. The device of claim 87, further comprising an association manager configured to authenticate a received message from said second network security apparatus during establishment of an association.

92. The device of claim 87, further comprising an apparatus adapted to generate an encryption key that is substantially unique to said ad hoc association.

93. The device of claim 92, further comprising at least one mechanism to verify that said message is unaltered during transmission over said second network comprises a cryptographic residue.

94. The device of claim 87, wherein said network security apparatus comprises at least one mechanism to authenticate at least one other computerized device or network security apparatus in communication with said second network.

95. The device of claim 94, wherein said at least one mechanism comprises a cryptographic residue.

96. The device of claim 87, wherein said computerized device comprises an untrusted operating system.

97. The device of claim 87, wherein said first network comprises the Internet, and said first network is in data communication with a website.

98. The device of claim 97, wherein said computerized device comprises a portable computing device.

* * * * *